United States Patent
Nakahara

(10) Patent No.: US 10,475,402 B2
(45) Date of Patent: Nov. 12, 2019

(54) LIQUID CRYSTAL DRIVING APPARATUS, IMAGE DISPLAY APPARATUS, LIQUID CRYSTAL DRIVING METHOD, AND LIQUID CRYSTAL DRIVING PROGRAM

(71) Applicant: CANON KABUSHIKI KAISHA, Tokyo (JP)

(72) Inventor: Ikunari Nakahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 15/861,757

(22) Filed: Jan. 4, 2018

(65) Prior Publication Data

US 2018/0197489 A1   Jul. 12, 2018

(30) Foreign Application Priority Data

Jan. 8, 2017   (JP) .................................. 2017-001490
Oct. 20, 2017   (JP) .................................. 2017-203586

(51) Int. Cl.
*G09G 5/10*   (2006.01)
*G09G 3/36*   (2006.01)
(Continued)

(52) U.S. Cl.
CPC ............. *G09G 3/36* (2013.01); *G02F 1/0311* (2013.01); *G02F 1/133602* (2013.01);
(Continued)

(58) Field of Classification Search
CPC ...... G09G 3/36; G09G 3/2022; G09G 3/3611; G09G 2310/0264; G09G 2320/0276;
(Continued)

(56) References Cited

U.S. PATENT DOCUMENTS 8,970,617 B2 *   3/2015   Lim ...................... G02B 27/26
                                                             345/596
2001/0043183 A1 *   11/2001   Ishikawa ............... H04N 5/202
                                                             345/89
(Continued)

FOREIGN PATENT DOCUMENTS

JP   2001-034229 A   2/2001
JP   2006-201630 A   8/2006
(Continued)

OTHER PUBLICATIONS

The above foreign patent documents were cited in the Sep. 4, 2018 Japanese Office Action, a copy of which is enclosed with an English Translation, that issued in Japanese Patent Application No. 2017203586.

*Primary Examiner* — Joe H Cheng
(74) *Attorney, Agent, or Firm* — Cowan, Liebowitz & Latman, P.C.

(57) ABSTRACT

A liquid crystal driving apparatus includes a driver configured to form a gradation in the pixel based on each gradation value in the plurality of sub-frame image data by sequentially controlling an application of a first voltage and an application of a second voltage lower than the first voltage for the plurality of pixels in each of a plurality of sub-field periods contained in one frame period. Where an input gradation value is defined as the gradation value of the input frame image data, the image data generator generates a first sub-frame image data having a first gradation value higher than the input gradation value and a second sub-frame image data having a second gradation value lower than the input gradation value as at least the plurality of sub-frame image data.

13 Claims, 25 Drawing Sheets

(51) Int. Cl.
*G02F 1/1335* (2006.01)
*G02F 1/03* (2006.01)
*G09G 3/20* (2006.01)
*H04N 9/31* (2006.01)

(52) U.S. Cl.
CPC ......... *G09G 3/2022* (2013.01); *G09G 3/3611* (2013.01); *H04N 9/3105* (2013.01); *H04N 9/3167* (2013.01); *G09G 2310/0264* (2013.01); *G09G 2320/0276* (2013.01)

(58) Field of Classification Search
CPC .. H04N 9/3105; H04N 9/3167; G02F 1/3011; G02F 1/133602
See application file for complete search history.

(56) References Cited

U.S. PATENT DOCUMENTS

| | | | | |
|---|---|---|---|---|
| 2003/0048238 A1* | 3/2003 | Tsuge | ................ | G09G 3/20 345/55 |
| 2004/0196274 A1* | 10/2004 | Song | ................ | G09G 3/2011 345/204 |
| 2005/0184944 A1* | 8/2005 | Miyata | ................ | G09G 3/3611 345/89 |
| 2007/0236439 A1* | 10/2007 | Chen | ................ | G09G 3/2007 345/89 |
| 2007/0241989 A1* | 10/2007 | Kim | ................ | G09G 3/3648 345/3.1 |
| 2007/0252795 A1* | 11/2007 | Shiomi | ................ | G09G 3/2048 345/87 |
| 2007/0273677 A1* | 11/2007 | Kim | ................ | G09G 3/3648 345/204 |
| 2008/0018559 A1* | 1/2008 | Ochi | ................ | G09G 3/20 345/59 |
| 2008/0074445 A1* | 3/2008 | Ochi | ................ | G09G 3/2022 345/690 |
| 2009/0309903 A1* | 12/2009 | Park | ................ | G09G 3/3611 345/690 |
| 2010/0098337 A1* | 4/2010 | Tsukamoto | ................ | G09G 3/2018 382/190 |
| 2013/0215326 A1* | 8/2013 | Sato | ................ | G09G 3/2025 348/453 |
| 2017/0069249 A1* | 3/2017 | Ichimasa | ................ | G09G 3/2033 |
| 2017/0098406 A1* | 4/2017 | Kobayashi | ................ | G09G 3/36 |
| 2018/0336812 A1* | 11/2018 | Oka | ................ | G09G 3/2022 |

FOREIGN PATENT DOCUMENTS

| | | |
|---|---|---|
| JP | 2008-065167 A | 3/2008 |
| JP | 2008-165161 A | 7/2008 |
| JP | 2008-287118 A | 11/2008 |
| JP | 2013-050679 A | 3/2013 |
| JP | 2013-050681 A | 3/2013 |
| JP | 2014-021345 A | 2/2014 |

* cited by examiner

PRIOR ART

1 FRAME

1 FRAME

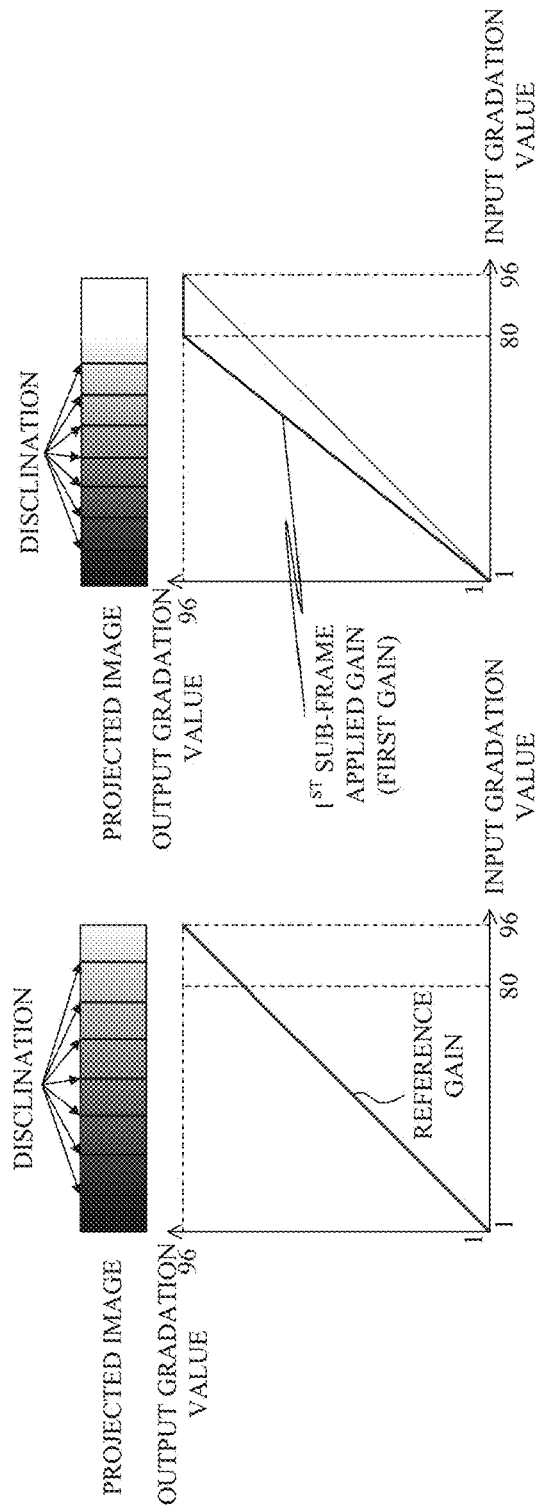

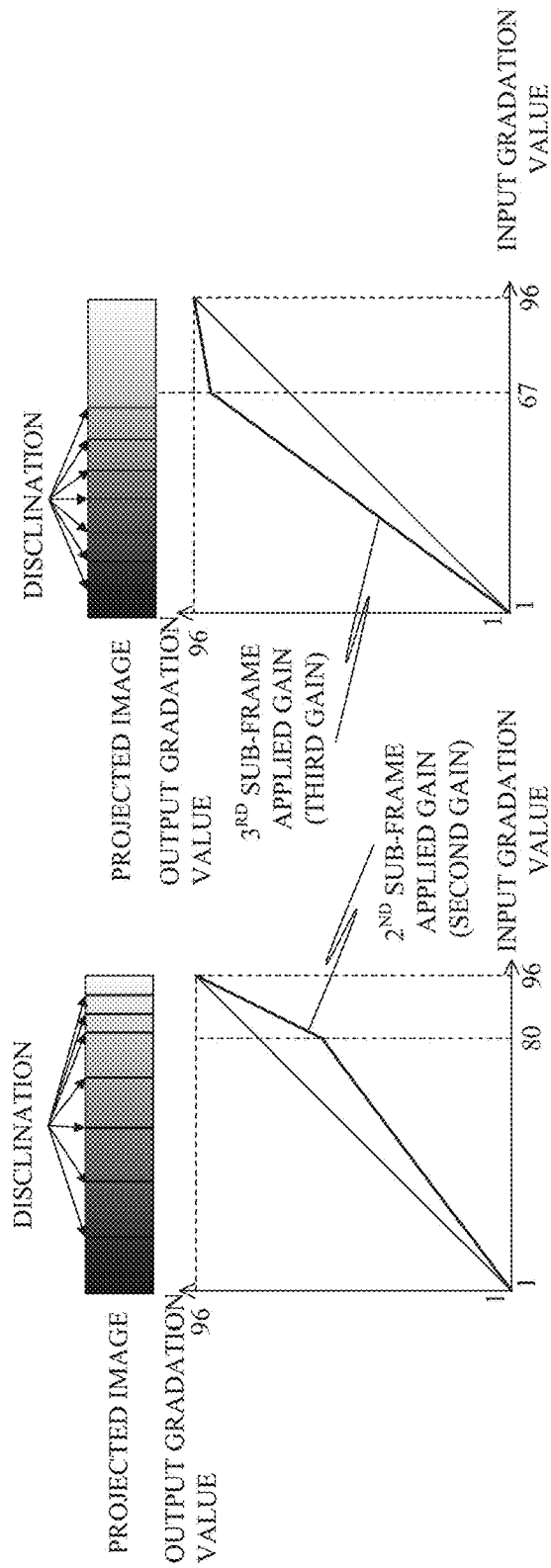

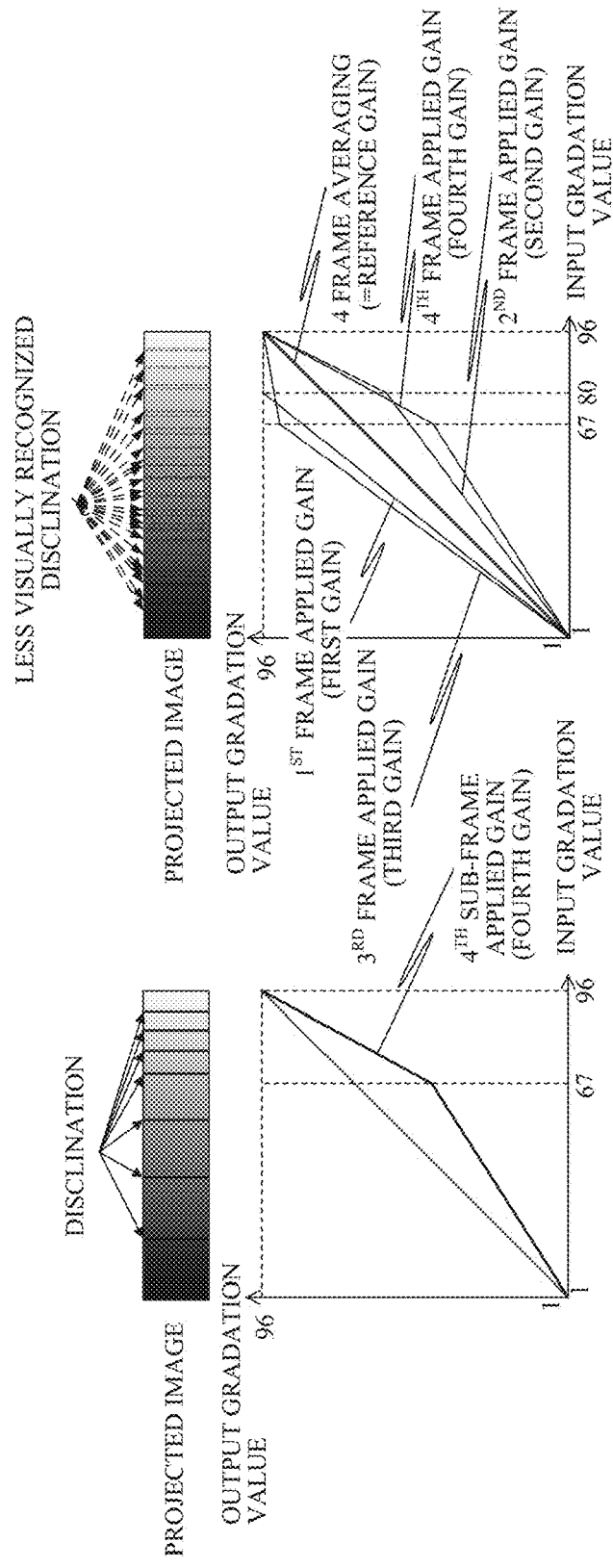

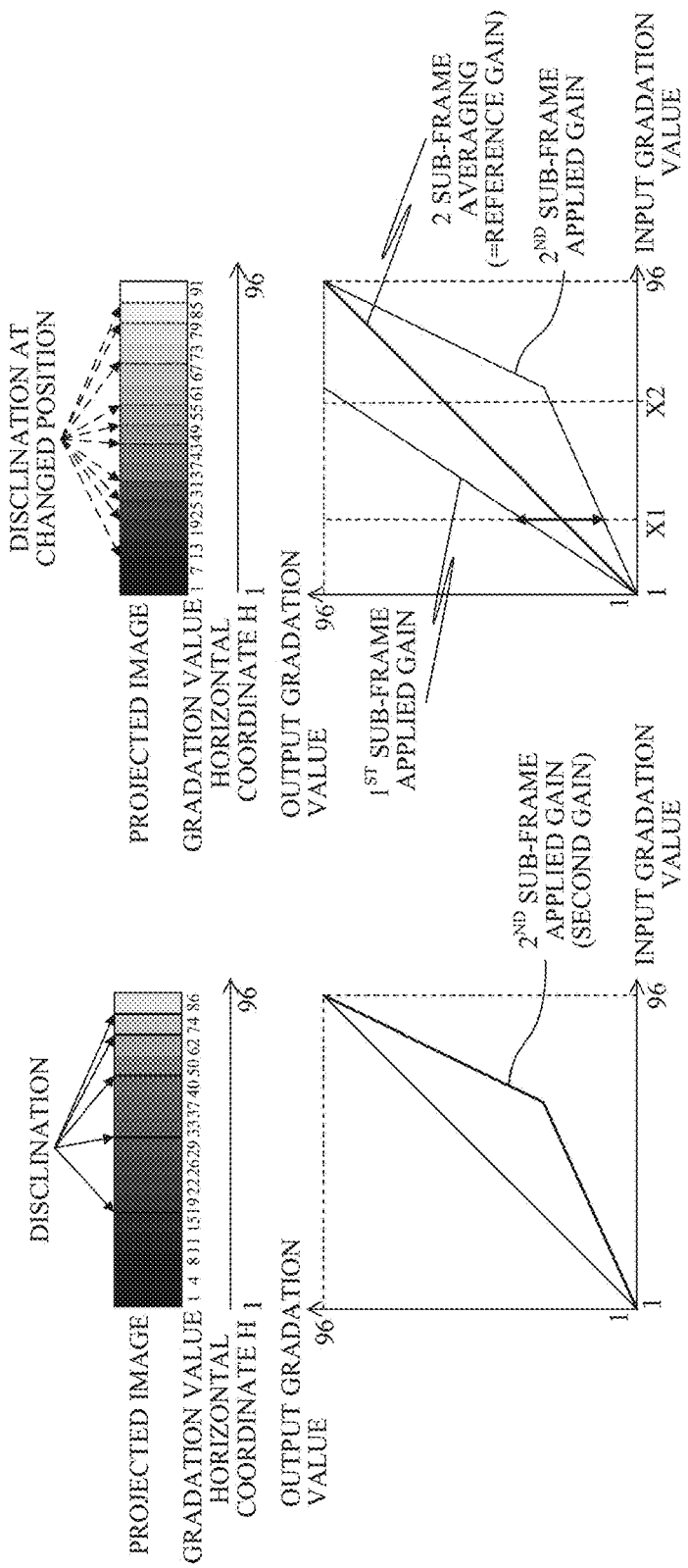

| HORIZONTAL COORDINATE H | 1 | 2 | 3 | 4 | 5 | 6 | 7 | 8 | 9 | 10 |
|---|---|---|---|---|---|---|---|---|---|---|
| INPUT IMAGE A | 87 | 88 | 89 | 90 | 91 | 92 | 93 | 94 | 95 | 96 |
| INPUT IMAGE B | 77 | 78 | 79 | 80 | 81 | 82 | 83 | 84 | 85 | 86 |

FIG. 24A

| HORIZONTAL COORDINATE H | 1 | 2 | 3 | 4 | 5 | 6 | 7 | 8 | 9 | 10 |
|---|---|---|---|---|---|---|---|---|---|---|
| A 1ST BRIGHT SUB-FRAME | 96 | 96 | 96 | 96 | 96 | 96 | 96 | 96 | 96 | 96 |
| A 2ND DARK SUB-FRAME | 78 | 80 | 82 | 84 | 86 | 88 | 90 | 92 | 94 | 96 |
| B 1ST BRIGHT SUB-FRAME | 85 | 86 | 87 | 88 | 89 | 90 | 91 | 92 | 94 | 95 |
| B 2ND DARK SUB-FRAME | 69 | 70 | 71 | 72 | 73 | 74 | 75 | 76 | 77 | 77 |

DISCLINATION GENERATION (between columns 1 and 2 of A 2ND DARK SUB-FRAME)

FIG. 24B

| HORIZONTAL COORDINATE H | 1 | 2 | 3 | 4 | 5 | 6 | 7 | 8 | 9 | 10 |
|---|---|---|---|---|---|---|---|---|---|---|
| A 1ST DARK SUB-FRAME | 78 | 80 | 82 | 84 | 86 | 88 | 90 | 92 | 94 | 96 |
| A 2ND BRIGHT SUB-FRAME | 96 | 96 | 96 | 96 | 96 | 96 | 96 | 96 | 96 | 96 |
| B 1ST DARK SUB-FRAME | 69 | 70 | 71 | 72 | 73 | 74 | 75 | 76 | 77 | 77 |
| B 2ND BRIGHT SUB-FRAME | 85 | 86 | 87 | 88 | 89 | 90 | 91 | 92 | 94 | 95 |

FIG. 24C

LIQUID CRYSTAL DRIVING APPARATUS, IMAGE DISPLAY APPARATUS, LIQUID CRYSTAL DRIVING METHOD, AND LIQUID CRYSTAL DRIVING PROGRAM

This application claims the benefit of Japanese Patent Applications Nos. 2017-001490, filed on Jan. 8, 2017, and 2017-203586, filed on Oct. 20, 2017, which are hereby incorporated by reference herein in their entirety.

BACKGROUND OF THE INVENTION

Field of the Invention

The present invention relates to a liquid crystal driving apparatus configured to drive a liquid crystal element with a digital driving method.

Description of the Related Art

Liquid crystal elements contain a transmission type liquid crystal element, such as a twisted nematic (TN) device, and a reflection type liquid crystal element, such as a vertical alignment nematic device (VAN) device. Driving methods of the liquid crystal element contain an analog driving method for controlling the brightness (luminance) by changing the voltage applied to a liquid crystal layer in accordance with the gradation, and a digital driving method configured to control the luminance by changing a voltage application period by binarizing the voltage applied to the liquid crystal layer. One digital driving method is a sub-field driving method that divides one frame into a plurality of sub-field periods on the time axis, and controls the application (on) and nonapplication (off) of the predetermined voltage to the pixel for each sub-field, and displays the gradation of the pixel.

A description will be given of the general sub-field driving method. FIG. 11 illustrates an example of dividing one frame period into a plurality of sub-field periods (bit lengths). A numerical value on each sub-field indicates a time weight of the sub-field to one frame. Herein, 64 gradations are expressed by one example. A period with a time weight of 1+2+4+8+16 will be referred to as an A field period, and a period with a time weight of 32 will be referred to as a B field period. An ON period is defined as a sub-field period in which the above predetermined voltage turns on, and an OFF period is defined as a sub-field period in which the predetermined voltage turns off.

FIG. 12 illustrates all gradation data corresponding to the sub-field division example illustrated in FIG. 11. The ordinate axis denotes a gradation, and an abscissa axis denotes one frame period. A white sub-field period represents an ON period in which the pixel is in a white display state, and a black sub-field period represents an OFF period in which the period is in a black display state. According to this gradation data, in displaying two gradations adjacent to each other (referred to as "adjacent gradations" hereinafter), such as a thirty-second gradation and a thirty-third gradation, on two pixels adjacent to each other (referred to as "adjacent pixels" hereinafter) in the liquid crystal display, the A sub-field period is set to the ON period for the thirty-second gradation, and to the OFF period for the thirty-third gradation. The B sub-field period is set to the OFF period for the thirty-second gradation, and to the ON period for the thirty-third gradation.

When the ON period and the OFF period simultaneously overlap in these adjacent pixels or when the predetermined voltage is applied to one of the adjacent pixels and is not applied to the other of the adjacent pixels, the so-called disclination occurs and the luminance of the pixel in the ON period lowers. A top in FIG. 15A illustrates the luminance drop image caused by the disclination when the horizontal gradation image is projected. A smooth shade is expressed without disclinations, whereas the luminance lowers and a dark line appears due to the influence of the disclination in the adjacent gradations when the ON period and the OFF period overlaps for a long time in the adjacent pixels.

Japanese Patent Laid-Open No. ("JP") 2013-050681 discloses a method for adding a common (uniform) correction amount to gradation data in all pixels for each frame, and for periodically changing the correction amount, and for making less visually recognized the image quality degradation caused by the disclination.

However, the method disclosed in JP 2013-050681 may damage the gradation. For example, the same correction amount as that added to gradation data of all pixels in a first frame is set so as to be subtracted from the gradation data in the next frame. Since the correction amount added to the gradation data of all pixels in the first frame is subtracted in the next frame, a pixel that displays halftone can express the original luminance by averaging the two frames and maintain the gradation. However, if the same correction amount added is the first frame is subtracted, a gradation of a pixel that displays a gradation lower than the correction amount becomes lower than a minimum gradation and thus the subtraction is unavailable. As a result, the luminance is higher than the original gradation due to the average of the two frames. On the other hand, if the correction amount is added to the first frame, a gradation of a pixel that displays a high gradation becomes higher than a maximum gradation and thus the addition is unavailable. As a result, the luminance is lower than the original gradation due to the average of the two frames.

SUMMARY OF THE INVENTION

This embodiment provides a liquid crystal driving apparatus, etc. configured to restrain the luminance and the gradation from lowering, and to prevent the image quality degradation caused by the disclination.

A liquid crystal driving apparatus according to one aspect of the present invention is configured to drive a liquid crystal element having a plurality of pixels. The liquid crystal driving apparatus includes an image data generator configured to generate plurality of sub-frame image data for input frame image data, and a driver configured to form a gradation in the pixel based on each gradation value in the plurality of sub-frame image data by sequentially controlling an application of a first voltage and an application of a second voltage lower than the first voltage for the plurality of pixels in each of a plurality of sub-field periods contained in one frame period. Where an input gradation value is defined as the gradation value of the input frame image data, the image data generator generates a first sub-frame image data having a first gradation value higher than the input gradation value and a second sub-frame image data having a second gradation value lower than the input gradation value as at least the plurality of sub-frame image data.

An image display apparatus including the liquid crystal driving apparatus and a liquid crystal element also constitutes another aspect of the present invention.

A liquid crystal driving method according to another aspect of the present invention is configured to drive a liquid crystal element having a plurality of pixels. The liquid crystal driving apparatus method includes the steps of generating a plurality of sub-frame image data for input frame image data, and forming a gradation in the pixel based on each gradation value in the plurality of sub-frame image data by sequentially controlling an application of a first voltage and an application of a second voltage lower than the first voltage for the plurality of pixels in each of a plurality of sub-field periods contained one frame period. Where an input gradation value is defined as the gradation value of the input frame image data, the image data generator generates a first sub-frame image data having a first gradation value higher than the input gradation value and a second sub-frame image data having a second gradation value lower than the input gradation value as at least the plurality of sub-frame image data.

A liquid crystal driving program as a computer program that enables a computer to execute the liquid crystal driving method also constitutes another aspect of the present invention.

Further features of the present invention will become apparent from the following description of exemplary embodiments with reference to the attached drawings.

BRIEF DESCRIPTION OF THE DRAWINGS

FIGS. 20A to 20F illustrate gains applied to first, second, third, and fourth sub-frames according to the third embodiment.

FIGS. 22D to 22G illustrate first and second gains and views of disclination dark lines according to the second embodiment.

FIGS. 242 to 24C illustrate special effects of the fourth embodiment.

DESCRIPTION OF THE EMBODIMENTS

A description will now be given of embodiments according to the present invention with reference to the accompanying drawings.

First Embodiment

Figure 1:
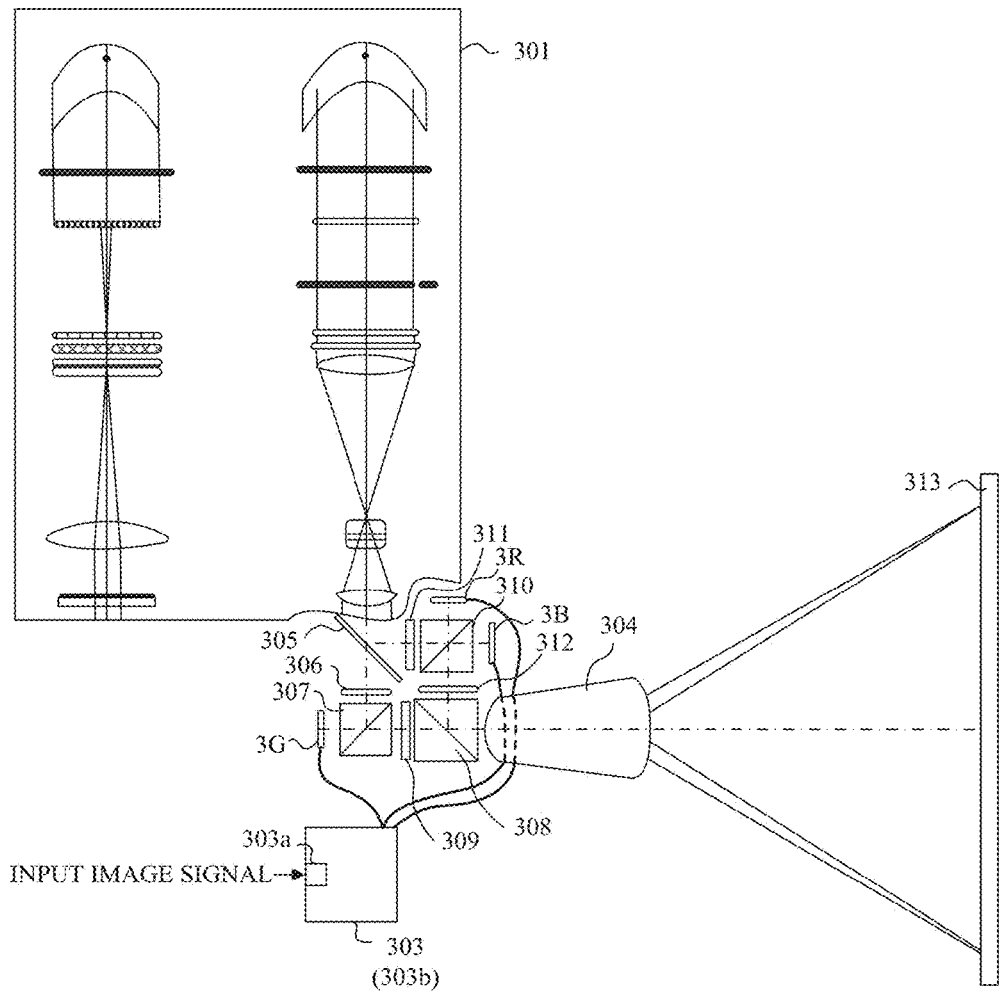
FIG. 1 illustrates an optical configuration of a liquid crystal projector according to a first embodiment of the present invention.

FIG. 1 illustrates an optical configuration of a liquid crystal projector as an image display apparatus according to a first embodiment of the present invention. While this embodiment discusses a projector as an illustrative image display apparatus using a liquid crystal element, the image display apparatus may be an image display apparatus other than the projector, using the liquid crystal element, such as a direct vision type monitor.

A control circuit 303 corresponds to a liquid crystal driving apparatus. The control circuit 303 includes an image input unit (image acquiring unit) 303a that obtains an input image signal (input image) from an unillustrated external apparatus, and a driving circuit unit 303b that generates a pixel driving signal corresponding to the following gradation data in accordance with the gradation (input gradation) of the input image signal. The pixel driving signal is generated for each of red, green, and blue colors, and a pixel driving signal for each corresponding color is input to a red liquid crystal element 3R, a green liquid crystal element 3G, and a blue liquid crystal element 3B. This configuration independently drives the red liquid crystal element 3R, the green liquid crystal element 3G, and the blue liquid crystal element 3B. The red liquid crystal element 3R, the green liquid crystal element 3G, and the blue liquid crystal element 3B are reflection type liquid crystal elements in a vertical orientation mode.

An illumination optical system 301 introduces white light from a light source, such as a discharge lamp, to a dichroic mirror 305 while aligning the polarization directions of the white light to each other. The dichroic mirror 305 reflects the magenta light and transmits the green light. The magenta light reflected by the dichroic mirror 305 enters a blue cross color polarizer 311, a retardation of hale wavelength is given to the blue light, and the blue light and red light generated while their polarization directions are orthogonal to each other. The blue light and the red light enter a polarization beam splitter 310, and the blue light transmits a polarization splitting film in the polarization beam splitter 310 and is led to the blue liquid crystal element 3B. The red light is reflected on the polarization splitting film the polarization beam splitter 310 and is led to the red liquid crystal element 3R.

The green light that has transmitted through the dichroic mirror 305 passes a dummy glass 306 configured to correct an optical path, enters a polarization splitting beam splitter 307, is reflected on its polarization splitting film, and is led to the green liquid crystal element 3G.

Each liquid crystal element (3R, 3G, 3B) modulates and reflects incident light in accordance with a modulation state of each pixel. The red light modulated by the red liquid crystal element 3R transmits through the polarization splitting film in the polarization beam splitter 310, enters the red cross color polarizer 312, and is provided with a retardation of a half wavelength there. The red light enters the polarization beam splitter 308, and is reflected on its polarization splitting film, and goes to a projection optical system 304.

The blue light modulated by the blue liquid crystal element 3B is reflected on the polarization splitting film in the polarization beam splitter 310, transmits through the red cross color polarizer 312, enters the polarization beam splitter 308, is reflected on its polarization splitting film, and goes to the projection optical system 304. The green light modulated by the green liquid crystal display device 3G transmits through the polarization splitting film in the polarization beam splitter 307 and a dummy glass 309 configured to correct the optical path length, enters the polarization beam splitter 308, transmits through its polarization splitting film, and goes to the projection optical system 304 having the projection lens. Thus, the chromatically combined red, green, and blue beams enter the projection optical system 304. The combined colored beam is enlarged and projected onto a target surface 313, such as a screen, by the projection optical system 304.

While this embodiment discusses use of the reflection liquid crystal element, the transmission type liquid crystal element may be used.

Figure 2:
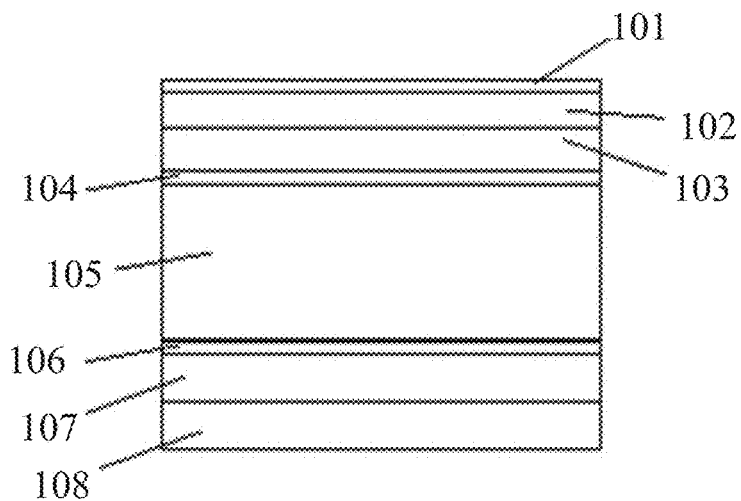
FIG. 2 is a sectional view of a liquid crystal element used for the projector according to the first embodiment.

FIG. 2 illustrates a sectional structure of the reflection type liquid crystal display (3R, 3G, 3B). Reference numeral 101 denotes an antireflection (AR) coat film. Reference numeral 102 denotes a glass substrate. Reference numeral 103 denotes a common electrode. Reference numeral 104 denotes an oriented film. Reference numeral 105 denotes a liquid crystal layer. Reference numeral 106 denotes an oriented film. Reference numeral 107 denotes a pixel electrode. Reference numeral 108 denotes a Si substrate.

The control circuit 303 illustrated in FIG. 1 drives each pixel in the above sub-field driving method. In other words, the control circuit 303 divides one frame period into a plurality of sub-field periods on the time axis, controls the application (ON) and the nonapplication (OFF) of the predetermined voltage to the pixel in accordance with the gradation data for each sub-field period, and thereby forms (displays) the gradation on the pixel. The one frame period is a period in which one frame image is displayed on the liquid crystal element. This embodiment drives the liquid crystal element with 120 Hz and sets one frame to 8.33 ms.

The OFF period may be the nonapplication period of the voltage, but does not necessarily set a voltage of 0 due to the design reasons, because the OFF period is a period for expressing pixels with black. In other words, the application and the nonapplication of the predetermined voltage may be an application of the first voltage (predetermined voltage) and an application of a second voltage lower than the first voltage.

A description will now be given of the setup of the sub-field period and the gradation data in the control circuit 303. The control circuit 303 includes a computer, and the setup of the following sub-field period and the turning on/off of the predetermined voltage for each sub-field period may be controlled in accordance with the liquid crystal driving program as a computer program.

Figure 3:
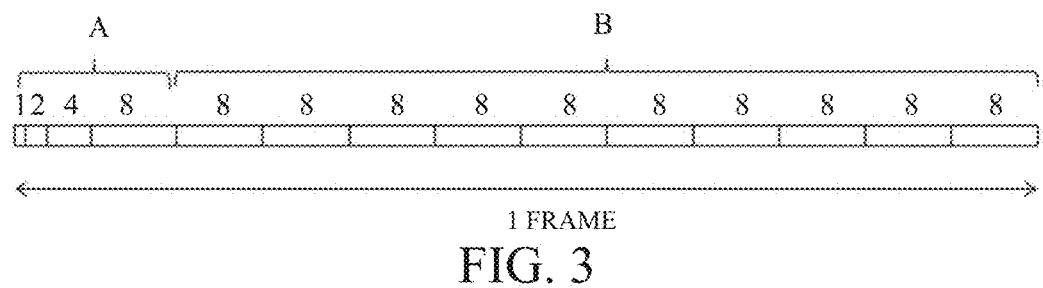
FIG. 3 illustrates a plurality of sub-field periods in one frame period according to the first embodiment.

FIG. 3 illustrates a division of one frame into a plurality of sub-field periods (bit lengths) according to this embodiment. A numerical value on each sub-field represents a time weight of the sub-field to one frame. This embodiment expresses 96 gradations. In this description, a period with a time weighs of 1+2+4+8 will be referred to as an A field period (first period), and a bit indicative of a gradation binarized in the A sub-yield period will be referred to as a lower bit. The periods with a time weight of 8 will be collectively referred to as a B field period (second period), and a bit indicative of a gradation binarized in the B sub-field period will be referred to as an upper bit. The time weight of 1 corresponds to 0.087 ms, and the time weight of 8 corresponds to 0.69 ms.

An ON period is defined as a sub-field period in which the predetermined voltage (first voltage) turns on, and an OFF period is defined as a sub-field period in which the predetermined voltage turns off (or the second voltage is applied).

Figure 4:
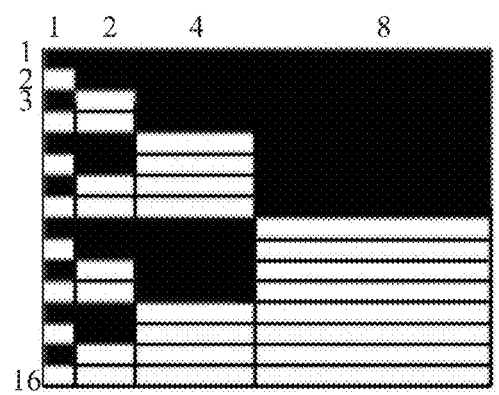
FIG. 4 illustrates gradation data in P sub-field period in the first embodiment.

FIG. 4 illustrates gradation data in the A sub-field period illustrated in FIG. 3. The ordinate axis denotes gradation, and the abscissa axis denotes one frame period. The A sub-field period expresses 16 gradations. The illustrated white sub-field period represents the ON period in which the predetermined voltage is applied so as to provide the pixels with the full white display state, and the black sub-field period represents the OFF period in which the predetermined voltage is not applied so as to provide the pixels with full black display state.

Figure 5:
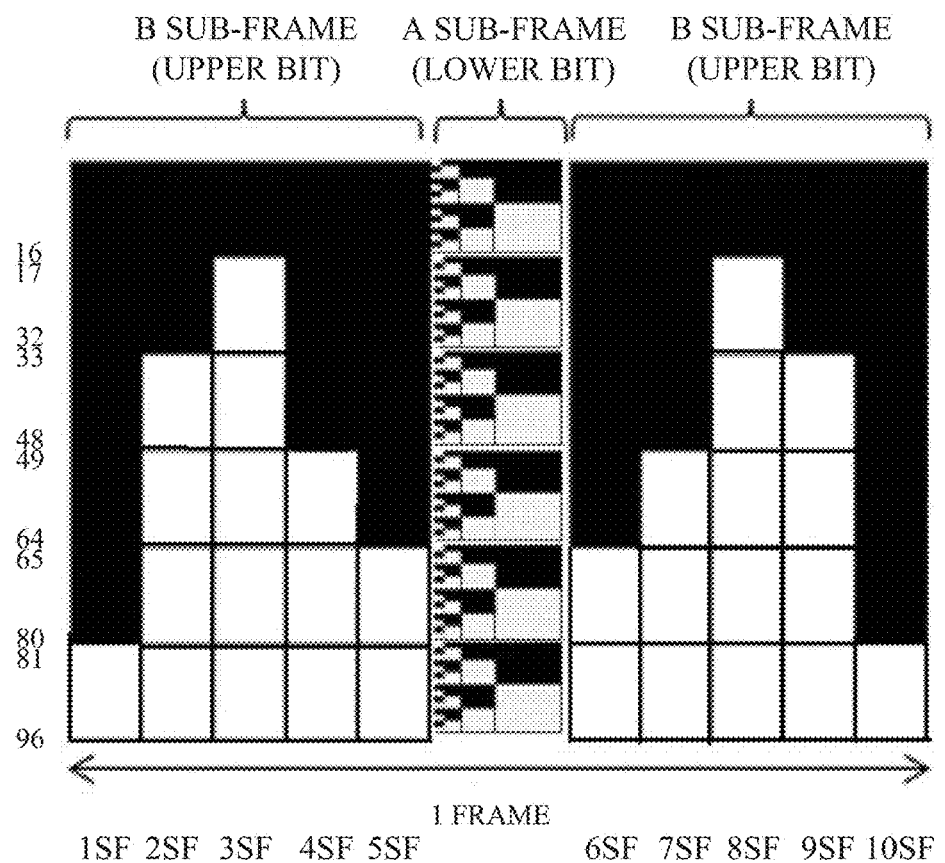
FIG. 5 illustrates all gradation data according to the first embodiment.

FIG. 5 illustrates the gradation data in the and B sub-field periods (upper and lower bits) according to this embodiment. This gradation data is used to express 96 gradations as all gradations. In this gradation data, the A sub-field period (lower bit) is arranged at the time center of the one frame period, and the B sub-field period (upper bit) is arranged before and after the time center while they are divided into sub-field periods 1SF to 5SF and sub-field periods 6SF to 10SF. In other words, the B sub-field period is divided into two, and each B sub-field period contains two or more sub-field periods.

According to this gradation data, in displaying the adjacent gradations that are two gradations adjacent to each other, such as $48^{th}$ and $49^{th}$ gradations, two adjacent pixels in the liquid display element, the A sub-field period is the ON period for the $48^{th}$ gradation and the OFF period for the $48^{th}$ gradation. The B sub-field periods 1SF, 4SF, 5SF, 6SF, 7SF, and 10SF are the OFF periods and the B sub-field periods 2SF, 3SF, 8SF, and 9SF are the ON periods for the $48^{th}$ gradation. The B sub-field periods 1SF, 5SF, 6SF, and 10SF are the OFF periods and the B sub-field periods 2SF, 3SF, 4SF, 7SF, 8SF, and 9SF are the ON periods for the $49^{th}$ gradation. In displaying the adjacent gradations in the adjacent pixels, an ON/OFF adjacent period occurs in which the ON period and the OFF period overlap each other in the adjacent pixels. More specifically, in displaying the $48^{th}$ gradation and the $49^{th}$ gradation in the adjacent pixels, the B subfield periods 4SF and 7SF are the ON/OFF adjacent periods.

Figure 13:
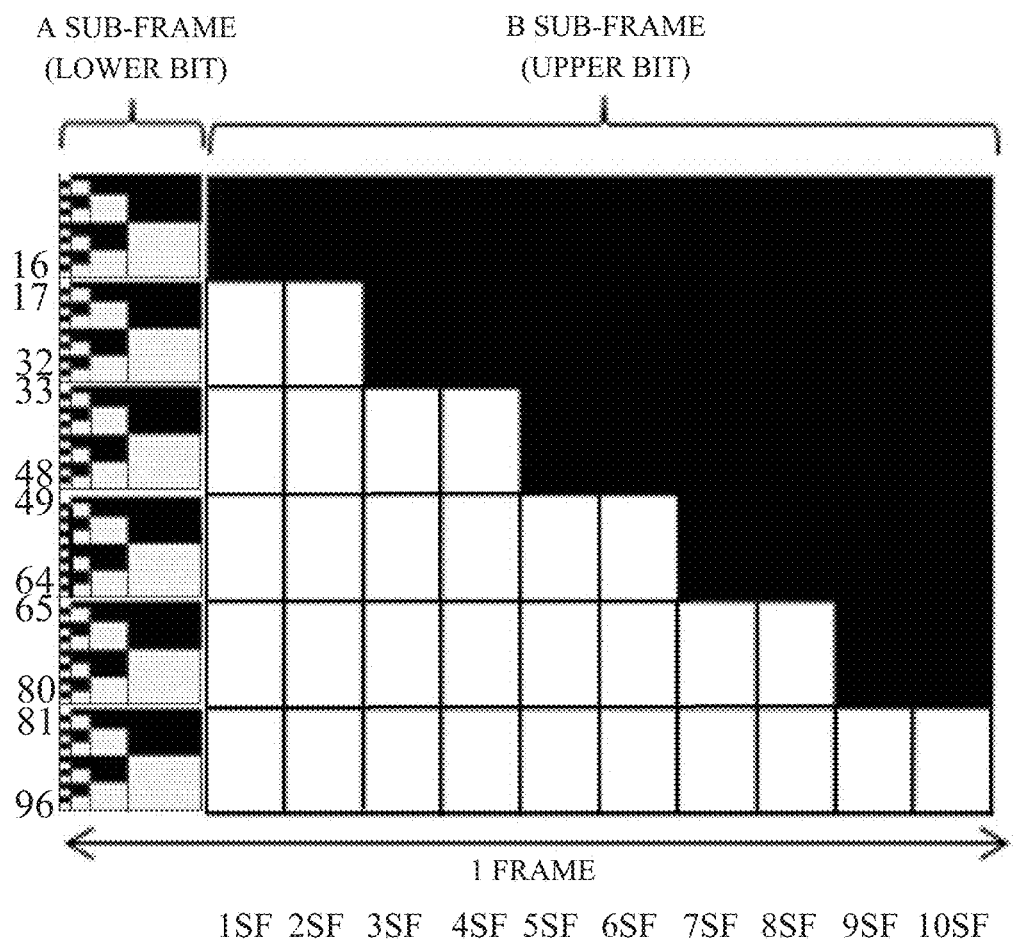
FIG. 13 illustrates all gradation data according to JP 2013-050681.

Herein, the gradation data according to this embodiment will be compared with the conventional gradation data (JP 2013-050681) illustrated in FIG. 13. The B sub-field period in a lump sum follows the A sub-frame period in the gradation data in FIG. 13, whereas the divided B sub-frame periods are arranged before and after the A sub-frame period in the gradation data according to this embodiment illustrated in FIG. 5. For example, when the $48^{th}$ and $49^{th}$ gradations are addressed, the B sub-field periods 5SF and 6SF are the ON/OFF adjacent periods in FIG. 13 and the time weight of 16 continues in the ON/OFF adjacent periods. This is true of other adjacent gradations, such as the 16$^{th}$ and 17$^{th}$ gradations, the 32$^{nd}$ and 33$^{rd}$ gradations, the 64$^{th}$ and 65$^{th}$ gradations, the 80$^{th}$ and 81$^{st}$ gradations, etc. On the other hand, according to this embodiment illustrated in FIG. 5, in any adjacent gradations, in the B sub-field periods, the ON/OFF adjacent periods continue in one sub-field period (=0.69 ms) with the time weight of 8. There are a plurality of (two) ON/OFF adjacent periods each serving as the one sub-frame period, which are separated from each other and hold the A sub-frame period.

Next follows a description of effects of the dispersed arrangement of the ON/OFF adjacent periods as in this embodiment.

Figure 6:
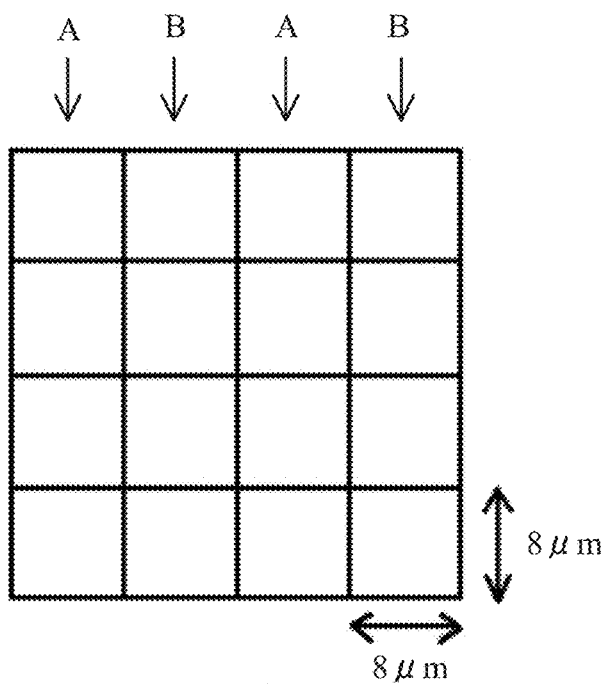
FIG. 6 illustrates a pixel line according to the first embodiment.

A description will now be given of the response characteristic of the liquid crystal when the pixels arranged in a matrix as illustrated in FIG. 6 are switched from the full white display state to the black-and-white (monochromic) display state in which the white and black are alternately displayed for each pixel line and when the pixels are switched from the full black display state to the monochromic display state. The 4×4 pixels illustrated in FIG. 6 are arranged in a matrix shape at an 8 μm pixel pitch. In the full white display state, both the pixels on the A pixel line and the pixels on the B pixel line display white in FIG. 6. In the monochromic display state, the pixels on the A pixel line are changed from the white display state to the black display state, and the pixels on the B pixel line turn maintain the white display state.

Figure 7:
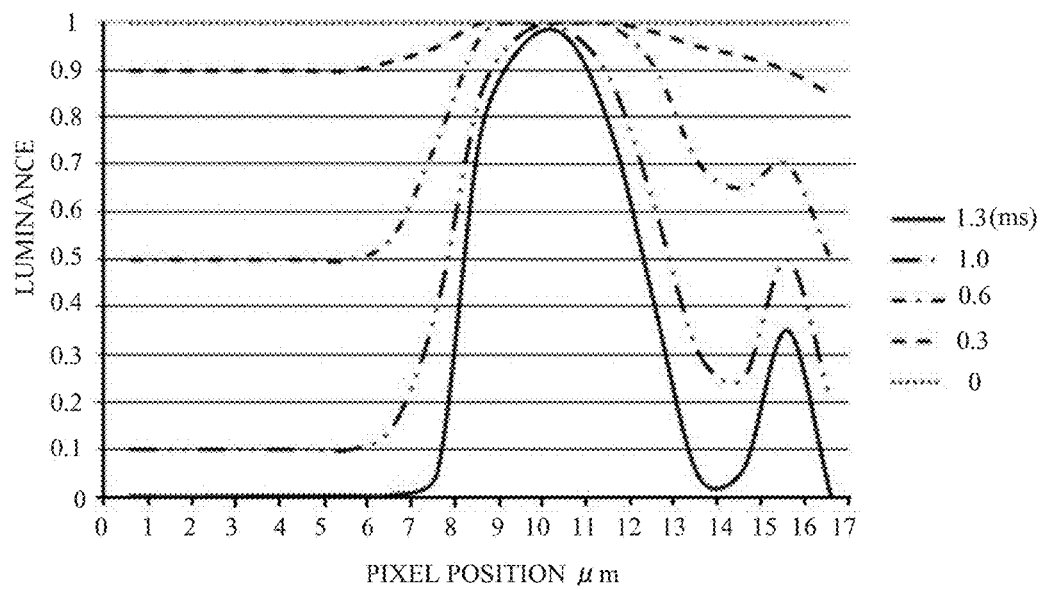
FIG. 7 illustrates a response characteristic of liquid crystal when full white display is switched to black-and-white (monochromic) display according to the first embodiment.

FIG. 7 illustrates the response characteristic of the liquid crystal. The abscissa axis denotes the pixel position, and the ordinate axis denotes the luminance in each pixel (although it is expressed as a ratio by setting white to 1). Positions of 0 to 8 μm in the abscissa axis illustrate the pixels on the A pixel line illustrated in FIG. 6, and positions of 8 to 16 μm in the abscissa axis illustrate the pixels on the B pixel line. A plurality of curves represent luminances for each elapsed time (0.3 ms, 0.6 ms, 1.0 ms, 1.3 ms) where the switching time from the full white display state to the monochromic display state is set to 0.

As described above, the pixels on the A pixel line are switched from the white display state to the black display state, but are not subject to the disclination due to the orientation of the pre-tilted angle of the liquid crystal, and their luminances comparatively uniformly change or get dark. On the other hand, no disclinations occur in the pixels on the B pixel line in the full white display state. However, after the pixels on the B pixel line in the monochromic display state are subject to the disclination, and their luminance curves gradually become distorted over time and get dark particularly near 12 μm to 16 μm (or their dark lines appear).

In general, a gamma curve (gamma characteristic) that determines the driving gradation of the liquid crystal element to the input gradation is produced based on the response characteristic where the gradation is changed while the same gradation is displayed on the whole surface of the liquid crystal element on which no disclinations occur. Hence, when the liquid crystal element is driven based on this gamma curve, the disclination occurs in the monochromic display state, and the luminance is lower than the original luminance based on the gamma curve.

Figure 8:
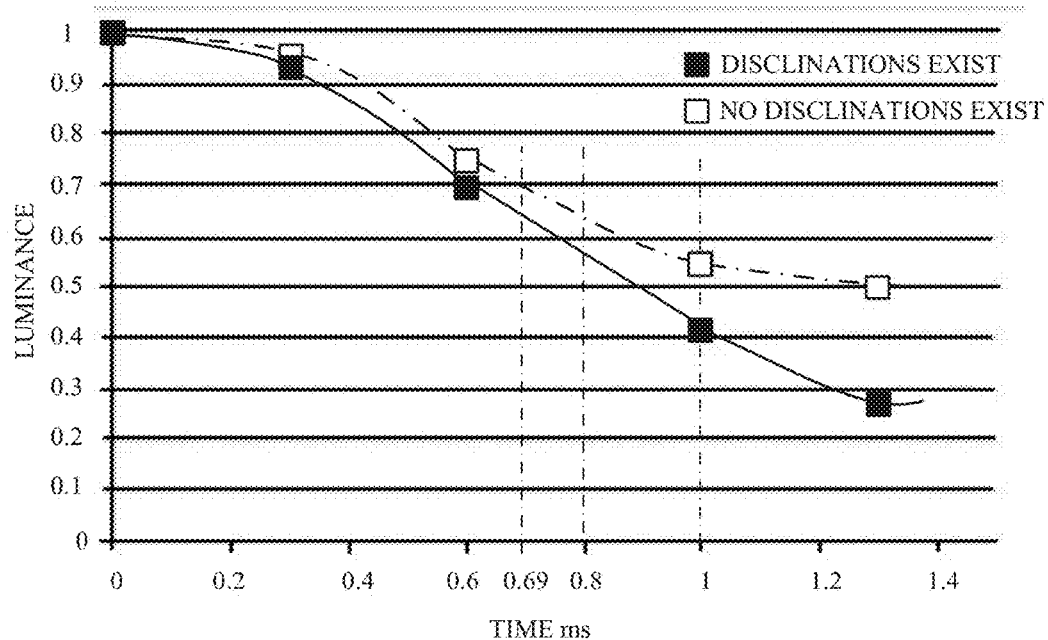
FIG. 8 illustrates a luminance response characteristic when the full white display is switched to the monochromic display according to the first embodiment.

FIG. 8 illustrates luminance changes with and without disclinations when the liquid crystal element is changed from the full white display state to the monochromic display state. The abscissa axis denotes an elapsed time from the switching time, and the ordinate axis denotes a change of the integrated value (simply referred to as a "luminance" hereinafter) of the total luminance in the pixels on the A and B pixel lines. The luminance is expressed as a ratio when the full white display is set to 1. Where the disclinations occur or exist, the luminance in the pixels on the A pixel line changes with a characteristic close to the response characteristic illustrated near 1 to 6 μm in FIG. 7, and the luminance in the pixels on the B pixel line maintains the white display state of the overall region with a luminance of 100%. As the subsequent time elapses, a luminance reducing amount when the disclinations exist is larger than that of the luminance when no disclinations occur or exist.

Figure 9:
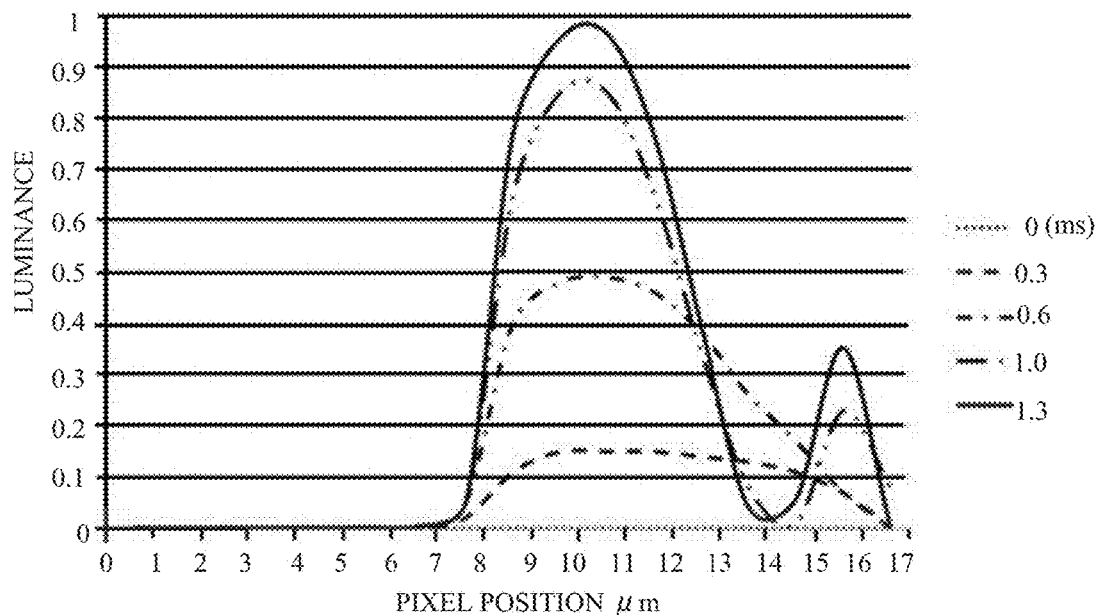
FIG. 9 illustrates a response characteristic of liquid crystal when full black display is switched to the monochromic display according to the first embodiment.

On the other hand, in switching the full black display state to the monochromic display state, the pixels on the A and B pixel lines illustrated in FIG. 6 start with the black display states. Then, the pixels on the A pixel line are changed to the black display state, and the pixels on the B pixel line are changed to the white display state. FIG. 9 illustrates the response characteristic of the liquid crystal. The abscissa axis denotes the pixel position, and the ordinate axis denotes the ratio of the luminance in each pixel while white is set to 1. Positions of 0 to 9 μm in the abscissa axis illustrate the pixels on the A pixel line illustrated in FIG. 6, and positions of 8 to 16 μm illustrate the pixels on the B pixel line. A plurality of curves represent luminances for each elapsed time (0.3 ms, 0.6 ms, 1.0 ms, 1.3 ms) when the switching time from the full black display state to the monochromic state is set to 0 ms.

As described above, the pixels on the B pixel line are switched from the black display state to the white display state, are subject to the disclination after the display state is changed to the white display state, and the luminance curve becomes gradually distorted over time. In particular, the luminance curve gets dark (or the dark line appears) near 12 μm to 16 μm. In addition, as the time elapses, the distorted shape of the luminance curve becomes conspicuous.

As described above, in general, the gamma curve (gamma characteristic) that determines the driving gradation of the liquid crystal element to the input gradation produced based on the response characteristic where the gradation is changed while the same gradation is displayed on the whole surface of the liquid crystal element on which no disclinations occur. Hence, when the liquid crystal element is driven based on the gamma curve, the disclination occurs in the monochromic display state, and the luminance is lower than the original luminance based on the gamma curve.

Figure 10:
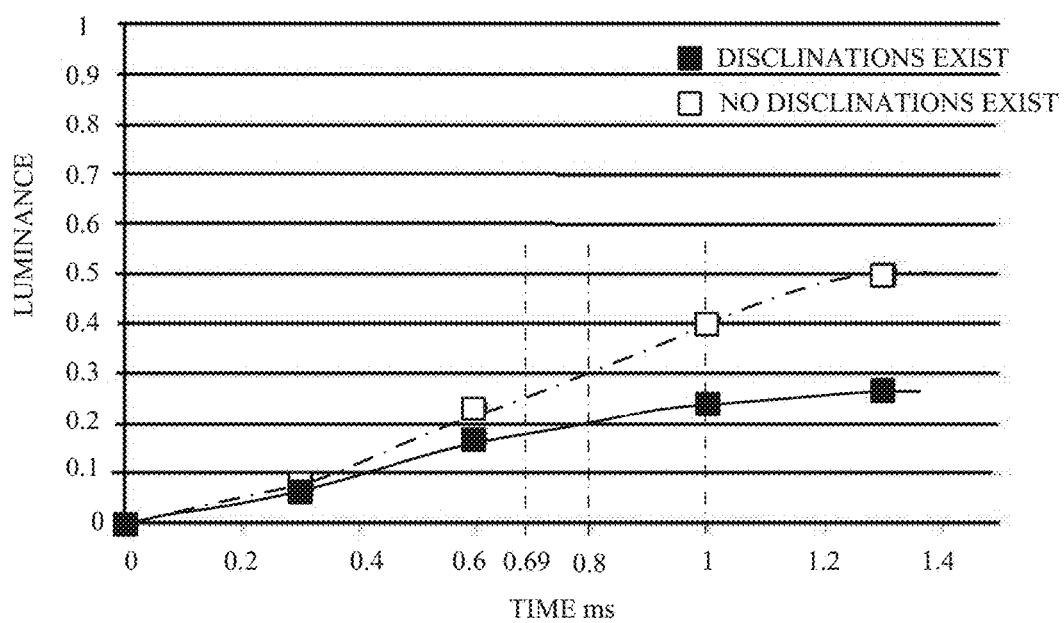
FIG. 10 illustrates a luminance response characteristic when the full black display is switched to black-and-white display according to the first embodiment.
Figure 11:
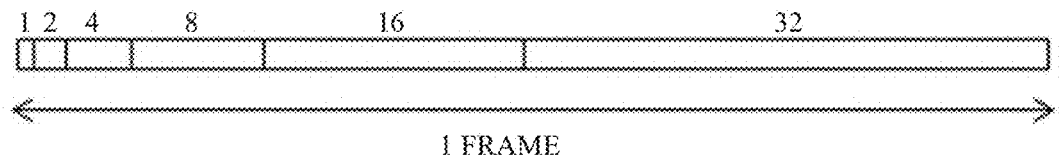
FIG. 11 illustrates a plurality of sub-field periods in one frame period according to prior art.
Figure 12:
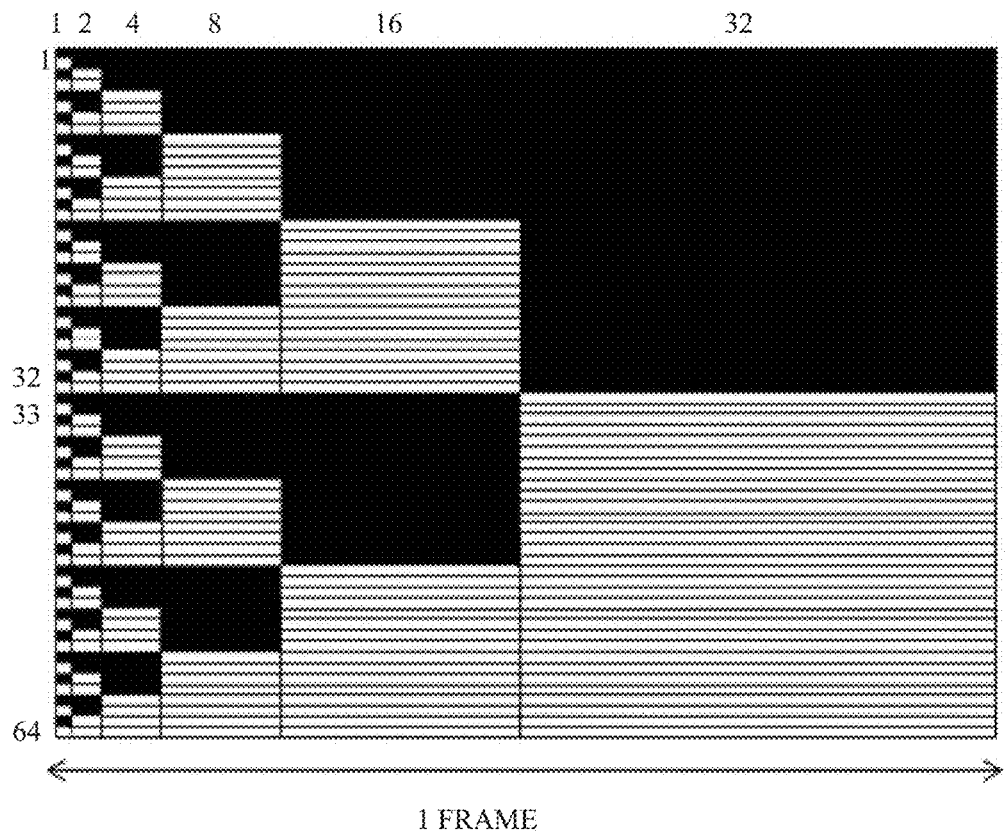
FIG. 12 illustrates all gradation data according to the prior art.

FIG. 10 illuminates luminance changes with and without distortions when the liquid crystal element is changed from the full black display state to the monochromic display state. The abscissa axis denotes an elapsed time from the switching time, and the ordinate axis denotes a change of the integrated value (simply referred to as a "luminance" hereinafter) of the total luminance in the pixels on the A and B pixel lines. For the luminance with no disclinations, the pixels on the A pixel line are always the black display state, and the pixels on the B pixel line are switched from the black display state to the white display state. On the other hand, where the disclinations exist, FIG. 9 illustrates a change in an integrated value of a sum of luminances in the pixels on the A and B pixel lines.

In FIG. 10, a luminance increase amount over time where the disclination occurs is smaller than that where no disclination occurs. In other words, the luminance is darker as a disclination time period becomes longer after the display state is switched from the full black display state to the monochromic display state, than that where no disclinations occur.

Next follows a description in which the pixels on the A pixel line display $48^{th}$ gradations and the pixel on the B pixel line display $49^{th}$ gradations in the conventional gradation data illustrated in FIG. 13. When this gradation data is used, the disclination occurs in the B sub-field periods 5SF and 6SF in the disclination display state in which the pixels on the A pixel line are the black display state and the pixels on the B pixel line are the white display state. In the period 4SF before the period 5SF, both the pixels on the A pixel line and the pixels on the B pixel line are the white display state, and no disclinations occur.

The response characteristic of the liquid crystal from 5SF to 6SF corresponds to the characteristic where the disclinations occur in FIG. 8. A luminance of 100% is output in the full white display in 4SF and the disclination occurs in a period of 1.39 ms from when 5SF starts to when 6SF ends. Thus, the start time of 5SF corresponds to 0 ms in FIG. 8, and the end time of 6SF corresponds to 1.39 ms. At this time, the luminance lowers down to 0.27 in comparison with 0.5 where no disclinations occur. As described above, on the basis of the gamma characteristic produced based on the same gradation on the whole surface, it becomes dark by a ratio of 54% (=0.27/0.5) in a period from 5SF to 6SF in which the disclination occurs.

On the other hand, a description will be given of this embodiment in which the pixels on the A pixel line (second pixels) display the $48^{th}$ gradation and the pixels on the B pixel line (first pixels) display the $49^{th}$ gradation due to the gradation data illustrated in FIG. 5. When this gradation data is used, the disclination occurs in the B sub-field periods 4SF and 7SF in which the pixels of the A and B pixel lines are the disclination display state. In the period 3SF before the period of 4SF, both the pixels on the A and B pixel Lines are the white display state and no disclinations occur.

The response characteristic of the liquid crystal in 4SF is a characteristic corresponding to the "disclinations exist" in FIG. 8. A luminance of 100% is output in the full white display in 3SF and the disclination occurs in a period 4SF of 0.69 ms. Thus, the start time of 4SF corresponds to 0 ms in FIG. 8, and the end time of 4SF corresponds to 0.69 ms. At this time, the luminance lowers down to 0.65 in comparison with 0.7 where no disclinations occur.

The response characteristic of the liquid crystal in 7SF as a sub-field period in which other disclinations occur is a characteristic corresponding to the "disclinations exist" in FIG. 10. A luminance is 0% in the full black display in 6SF and the disclination occurs in a period 7SF of 0.69 ms. Thus, the start time of 7SF corresponds to 0 ms in FIG. 10, and the end time of 7SF corresponds to 0.69 ms. At this time, the luminance lowers down to 0.18 in comparison with 0.25 where no disclinations occur.

In the periods 4SF and 7SF, a sum of luminance where no disclinations occur is 0.95 (=0.70+0.25) whereas a sum of luminance where disclinations exist is 0.83 (=0.65+0.18). On the basis of the gamma characteristic produced based on the same gradation on the whole surface, the disclination display state is dark down to 87% (=0.83/0.95). In other words, this embodiment can restrain the luminance from lowering.

Next follows a description of displaying other adjacent gradations. A description will now be given of a case where the pixels on the A pixel line illustrated in FIG. 6 display the $16^{th}$ gradation and the pixels on the B pixel line display $17^{th}$ gradation through the conventional gradation data illustrated in FIG. 13. When this gradation data is used, the disclination occurs in the B sub-field periods 1SF and 2SF as the disclination display state in which the pixels on the A pixel line are the black display state and the pixels on the B pixel line are the white display state.

The response characteristic of the liquid crystal from 1SF to 2SF is a characteristic corresponding "disclinations exist" in FIG. 10. The disclination occurs in a period of 1.39 ms from the start time of 1SF to the end time of 2SF. Hence, the start time of 1SF corresponds to 0 ms in FIG. 10, and the end time of 2SF corresponds to 1.39 ms. At this time, the luminance lowers down to 0.27 in comparison with 0.5 where no disclinations exist. As described in the first embodiment, on the basis of the gamma characteristic produced based on the same gradation on the whole surface, it gets dark with 54% (=0.27/0.5) in a period from 1SF to 2SF in which the disclination occurs.

On the other hand, a description will be given of this embodiment in which the pixels on the A pixel line (second pixels) display the $16^{th}$ gradation and the pixels on the B pixel line (first pixels) display the $17^{th}$ gradation through the gradation data illustrated in FIG. 5. When this gradation data is used, the disclination occurs in the B sub-field periods 3SF and 8SF in which the pixels of the A and B pixel lines are the disclination display state. In the period 2SF before the period 3SF, both the pixels on the A and B pixel lines are the black display state and no disclinations occur. The response characteristic of the liquid crystal in 3SF is a characteristic corresponding "disclinations exist" in FIG. 10. The luminance is 0% in the full black display state in 2SF, and the disclination occurs in a period 3SF of 0.69 ms. The start time of 3SF corresponds to 0 ms in FIG. 10, and the end time of 3SF corresponds to 0.69 ms. At this time, the luminance lowers down to 0.18 in comparison with 0.25 where no disclinations occur.

The response characteristic of the liquid crystal in the sub-field period 8SF in which another disclination occurs is a characteristic corresponding "disclinations exist" in FIG. 10. The luminance is 0% in the full black display state in 7SF, and the disclination occurs in a period 8SF of 0.69 ms. The start time of 8SF corresponds to 0 ms in FIG. 10, and the end time of 8SF corresponds to 0.69 ms. At this time, the luminance lowers down to 0.18 in comparison with 0.25 where no disclinations occur.

In 3SF and 8SF, a sum of luminance where no disclinations exist is 0.50 (=0.25+0.25) whereas a sum of luminance where disclinations exist 0.36 (=0.18+0.18). On the basis of the gamma characteristic produced based on the same gradation on the whole surface, the disclination display state is dark down to 72% (=0.36/0.50). In other words, this embodiment can restrain the luminance from lowering.

Thus, this embodiment separates (disperses) a plurality of ON/OFF adjacent periods as the disclination display state from each other in one frame in displaying the adjacent gradations, and shortens the one continuous ON/OFF adjacent period. In other words, before the luminance caused by the disclination significantly drops, the disclination display state in the adjacent pixels is transferred to the display state. This configuration can restrain the luminance drop caused by the disclination, prevent the dark line from standing out, and display a good quality image.

The above driving method of the liquid crystal element (referred to as a "first driving method" hereinafter) can restrain the disclination. However, in order to further restrain the dark line caused by the disclination from standing out, this embodiment also uses the following driving method (referred to as a "second driving method" hereinafter).

Figure 14:
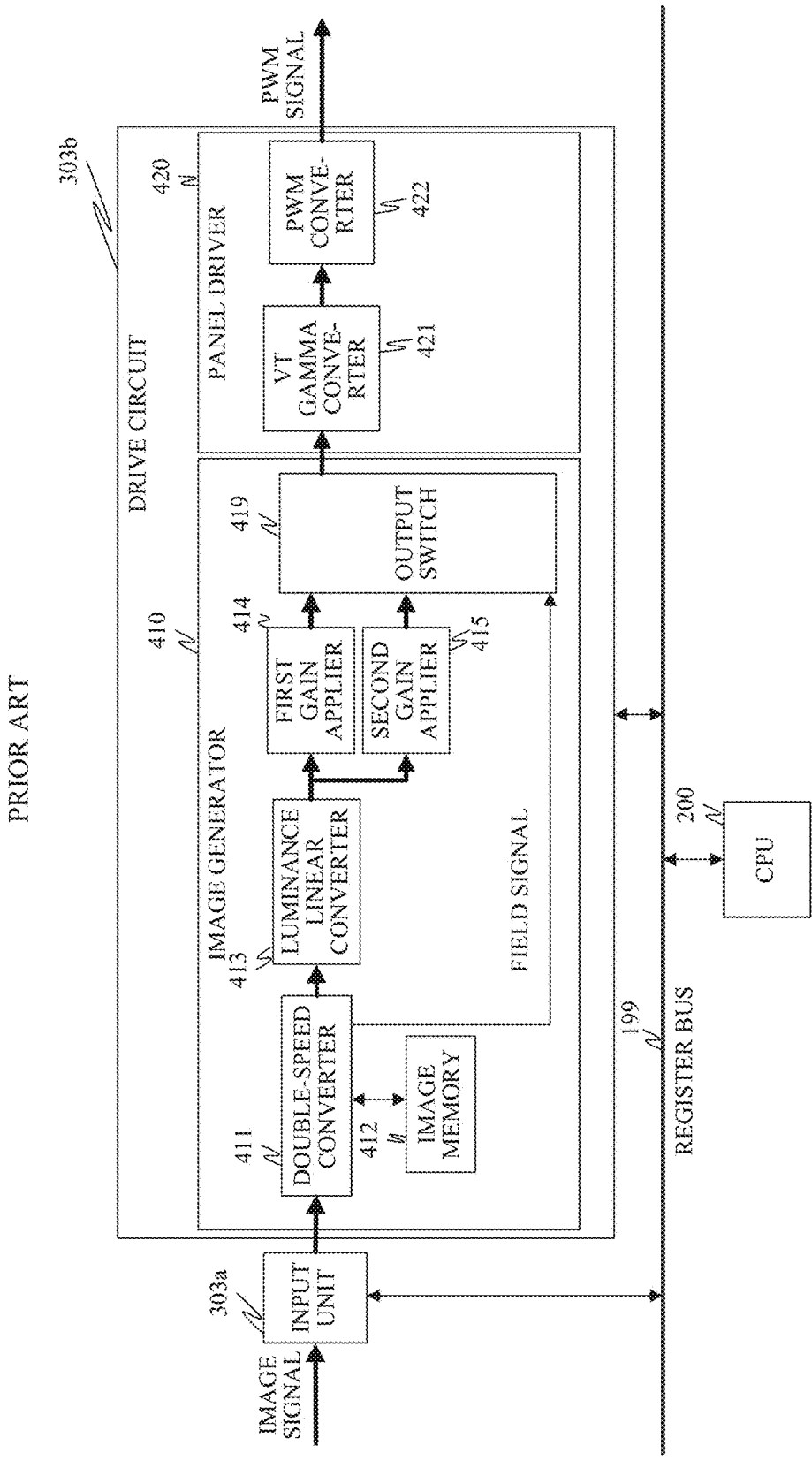
FIG. 14 is a block diagram of a configuration of a control circuit according to the first embodiment.

FIG. 14 illustrates an internal configuration of the control circuit 303. The input unit 303a takes in the input image signal via an unillustrated receiver IC, such as the DVI and the HDMI. The input unit 303a outputs input image data in predetermined image format through the down conversion or up conversion of the input image signal by the scaling function. The input image data includes a plurality of continuous input frame image data, and contains a vertical synchronizing signal and a horizontal synchronizing signal.

The input unit 303a and the driving circuit unit 303b are connected to the CPU 200 via a register bus 199.

The driving circuit unit 303b sequentially receives input frame image data from the input unit 303a, and drives each of the plurality of pixels (referred to as a "liquid crystal pixel" hereinafter) in the liquid crystal element 3 (three liquid crystal elements 3R, 3G, 3B in FIG. 1). In other words, a pixel driving signal is generated which displays the gradation in each liquid crystal pixel. The driving circuit unit 303b includes an image generator 410 and a panel driver 420. The image generator 410 corresponds to image data generator, and the panel driver 420 corresponds to driver.

The image generator 410 includes a double-speed converter 411, an image memory 412, a luminance linear converter 413, a first gain applier 414, a second gain applier 415, and an output switch 419.

The double-speed converter 411 writes each input frame image data into the image memory 412, and a plurality of sub-frame image data for the input frame image data. More specifically, in the double-speed conversion, the double-speed converter 411 generates sub-frame image data by using a width twice as long as that for writing into the image memory 412 or by reading at a speed twice as high as that of the writing speed into the image memory 412. For example, the double-speed converter 411 generates two sub-frame image data in the period corresponding to 120 Hz, where the vertical synchronizing signal of the input frame image data has a frequency of 60 Hz. Each of plurality of sub-frame image data generated by the double-speed converter 411 is the same image data as the input frame image data. In other words, the input frame image data and the plurality of sub-frame image data generated by the double-speed converter 411 have the same gradation value in the same pixel position between them.

In this embodiment, the double-speed converter 411 generates two sub-frame image data, and the previously generated sub-frame image data will be referred to as first ($1^{st}$) sub-frame image data and the subsequently generated sub-frame image data will be referred to as second ($2^{nd}$) sub-frame image data. The double-speed converter 411 generates a field signal used to identify whether the generated sub-frame image signal is the first sub-frame image data or the second sub-frame image data, and outputs it to an output switch 419.

The luminance linear converter 413 performs a gradation value conversion for an input gradation value so that the driving gradation of the liquid crystal pixel linearly increases as the gradation value of each sub-frame image data input from the double-speed converter 411 (or the input gradation value) increases. In the following description, a luminance linear relationship means that the driving gradation of the liquid crystal pixel linearly (proportionally) increases as the input gradation value increases. The luminance linear converter 413 outputs an input gradation value after the gradation value of the first sub-frame image data is converted, to the first gain applier 414, and an input gradation value after the gradation value of the second sub-frame image data is converted, to the second gain applier 415.

The first gain applier 414 calculates the first output gradation value as the first gradation value by applying (multiplying) the following first gain to the input gradation value after the gradation value of the first sub-frame image data is converted. The first gain applier 414 outputs the first sub-frame image data having the first output gradation value to the output switch 419. In addition, the second gain applier 415 calculates the second output gradation value as the second gradation value by applying the following second gain to the input gradation value after the gradation value of the second sub-frame image data is converted. The second gain applier 415 outputs the second sub-frame image data having the second output gradation value to the output switch 419.

In the first and second gain appliers 414 and 415 according to this embodiment, an area of the input gradation value equal to or smaller than the predetermined gradation value is set to a low gradation area, and an area (or a predetermined area) of the input gradation value larger than the predetermined gradation value is set to a high gradation area. The first and second gain appliers 414 and 415 set different gains in the first and second gains for the low gradation area and the high gradation area. The calculations performed by the first and second gain appliers 414 and 415 will be collectively referred to as a gain calculation in the following description, and a detailed description thereof will be given later.

The output switch 419 operates in synchronization with the vertical synchronizing signal of each sub-frame image data, and alternately switches and outputs the first and second sub-frame image data input from the first and second gain appliers 414 and 415 in accordance with the field signal from the double-speed converter 411. This configuration alternately inputs the first gain-calculated sub-frame image data and the second gain-calculated sub-frame image data into a panel driver 420.

The panel driver 420 includes a VT gamma converter 421 and a PWM converter 422. The VT gamma converter 421 performs a gamma correction for the first and second output gradation values in the first and second sub-frame image data so as to obtain a necessary optical characteristic in accordance with the gradation characteristic that changes based on the response characteristic the liquid crystal in the liquid crystal element 3.

The PWM converter 422 outputs a PWM signal for driving the liquid crystal element 3 in the above sub-field driving method based on the first and second gamma-corrected sub-frame image data (first and second output gradation values) from the VT gamma converter 421.

Figures 15A, 15B:
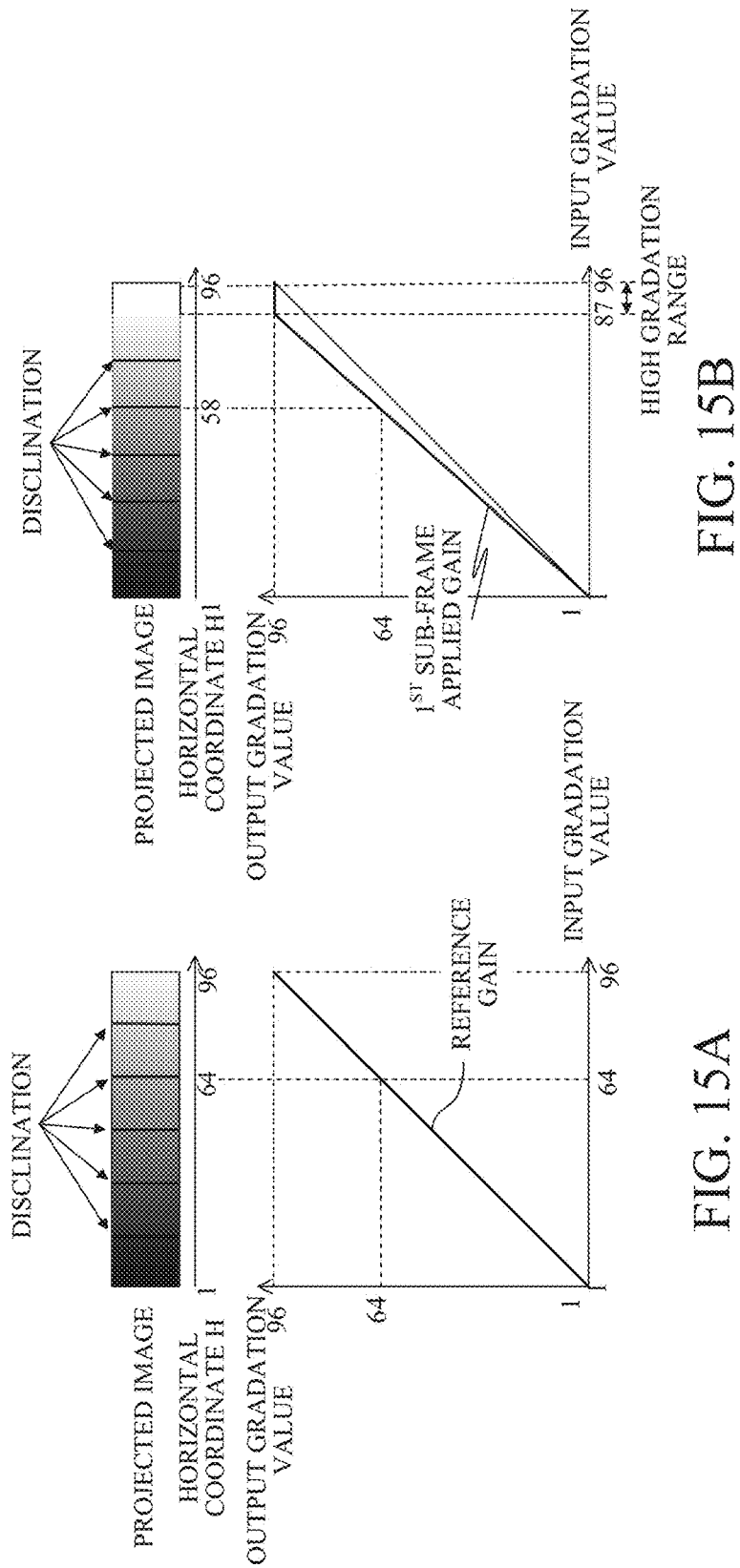
FIGS. 15A to 15D illustrate first and second gains and views of disclination dark lines according to the first embodiment.
Figures 15C, 15D:
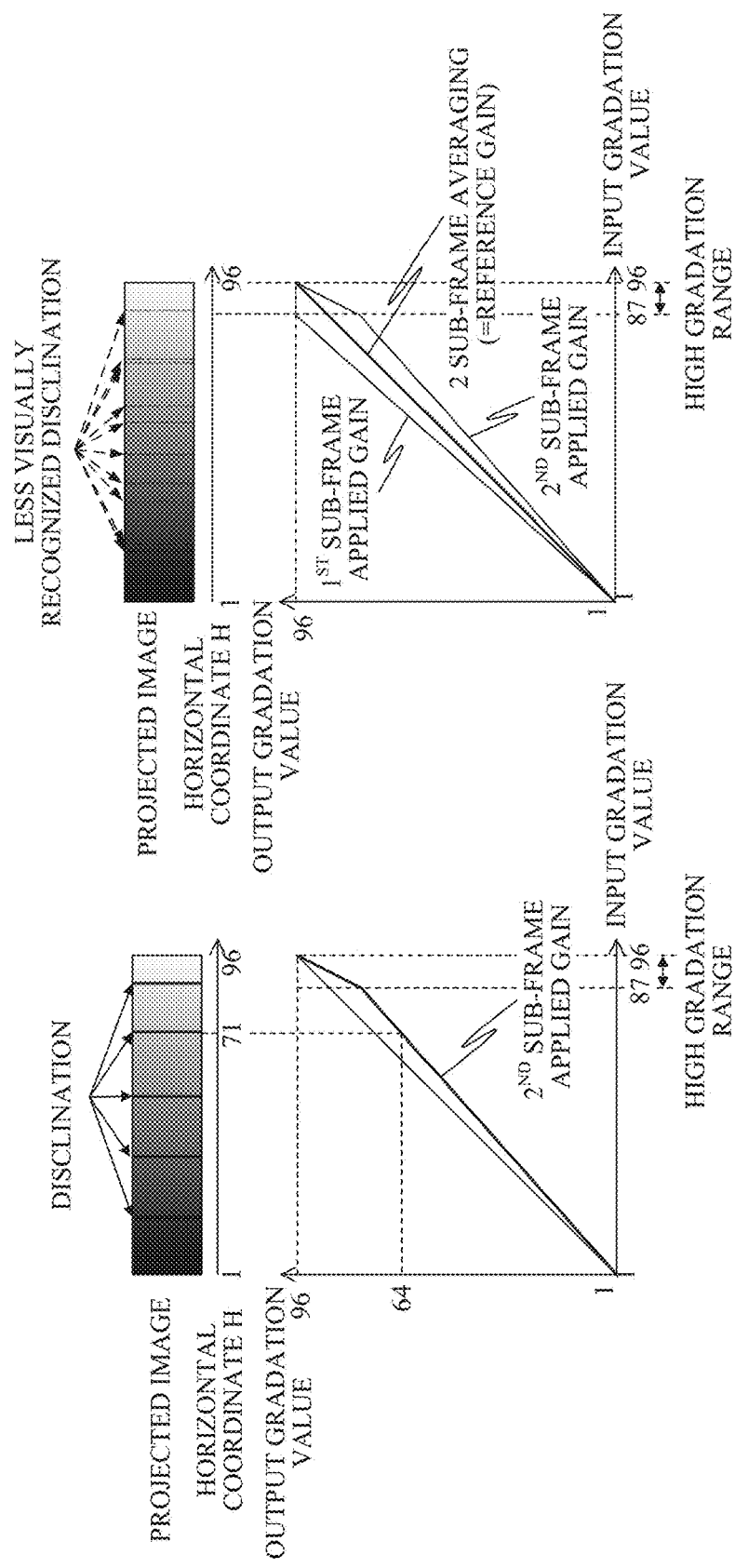

Referring now to FIGS. 15A to 15C, a description will be given of the gain calculations in the first and second gain appliers 414 and 415. Now assume that each of the reflection type liquid crystal elements 3G, 3R, and 3B has 96 pixels in the horizontal direction. FIGS. 15A to 15C illustrate a relationship between the first and second gains which the first and second gain appliers 414 and 415 apply to the input generation values and a view of an image degradation caused by the disclination in the gradation image (projected image) projected onto the target plane. The image deterioration caused by the disclination is illustrated as a dark line (black line).

FIG. 15A illustrates a relationship between an input gradation value and an output gradation value when the gain calculation is not performed or reference gain of 1.0 times (100%) is applied to the input gradation value. At this time, the projected image has five dark lines generated by the disclination (which is simply illustrated as "disclination" in FIG. 15A and will be referred to as a "disclination dark line" hereinafter).

The first gain applier 414 applies the first gain higher than a target gain as a reference gain illustrated in FIG. 15A to an input gradation value in the first sub-frame image data, as illustrated in FIG. 15B. The first gain is a gain higher than the target gain, and has a different inclination according to the area in the input gradation value. More specifically, the first gain is a gain of 1.1 times (110%) where the input gradation value is the low input gradation value contained in the low gradation area from 1 to 87. In addition, the first gain is a gain that sets the output gradation value to the maximum gradation value (saturated gradation value) settable in the sub-frame image data where the input gradation value is a high input gradation value contained in the high gradation area from 88 to 96. In other words, the first gain for the high gradation area is a gain that sets the first output gradation value for the high input gradation value to the maximum gradation value settable in the first sub-frame image data with an increase ratio of 0% for an increase of the high input gradation value.

On the other hand, the second gain applier 415 applies the second gain lower than the target gain as the reference gain, to the input gradation value in the first sub-frame image data, as illustrated in FIG. 15C. As described above, the second gain is a gain lower than the target gain, and has a different inclination according to the area in the input gradation value. More specifically, the second gain is a gain that provides an average of 1.0 times (100%) with the first gain, and is 0.9 times (90%) for the input gradation value in the low gradation area from 1 to 87. In addition, the second gain is a gain that provides an average of 1.0 times (100%) with the first gain that provides the saturated gradation value for the input gradation value in the high gradation range from 88 to 96.

The output switch 419 alternately outputs the first sub-frame image data gain-calculated and output from the first gain applier 411, and the second sub-frame image data gain-calculated and output from the second gain applier 415 to the VT gamma converter 421. This configuration sequentially (alternately) displays, on each liquid crystal element and the target plane, the first sub-frame image corresponding to the first gain-calculated sub-game image data and the second sub-frame image corresponding to the second gain-calculated sub-frame image data. When the luminances of these two sub-frame images are averaged, a projected image can be displayed in which a disclination dark line is less visually recognized by an observer, while the luminance and the gradation do not lower in comparison with the projected image (frame image) without the gain calculation.

Assume that X is an input gradation value, Y1 an output gradation value from the first gain applier 414, and Y2 is an output gradation value from the second gain applier 415. Ymax is a maximum value of the output gradation value, and A (1<A≤2) is a gain applied to the low gradation area in the first gain applier 414. Then, the gains applied to the input gradation values in the sub-frame image data by the first and second gain appliers 414 and 415 are expressed as follows.

When $X < Ymax/A$, then $Y1 = AX$ (1)

When $X \geq Ymax/A$, then $Y1 = Ymax$ (2)

When $X < Ymax/A$, then $Y2 = (2-A)X$ (3)

When $X \geq Ymax/A$, $Y2 = 2X - Ymax$ (4)

A description will be given of why these gains can restrain the disclination dark line from being visually recognized.

Without gain calculations, output gradation values 64 and 65 are displayed on the adjacent liquid crystal pixels having the horizontal coordinates H (or input gradation values) of 64 and 65, as illustrated in FIG. 15A. At this time, due to the above reasons, the disclination dark line occurs in the adjacent liquid crystal pixels located at the horizontal coordinates H of 64 and 65.

When the first gain illustrated in FIG. 15B is applied to the input gradation values 64 and 65, the output gradation values 64 and 65 are displayed in the adjacent liquid crystal pixels located at the horizontal coordinates H of 58 and 59. The disclination dark line occurs in the adjacent liquid crystal pixels located at the horizontal coordinates H of 58 and 59.

When the second gain illustrated in FIG. 15C is applied to the input gradation values 64 and 65, the output gradation values 64 and 65 are displayed in the adjacent liquid crystal pixels located at the horizontal coordinates H of 71 and 72. The disclination dark line occurs in the adjacent liquid crystal pixels located at the horizontal coordinates H of 71 and 72.

When the first thus-obtained gain-calculated sub-frame image and the second thus-obtained gain-calculated sub-frame image are alternately projected (displayed), the position of the disclination dark line changes on the target plane. Hence, the concentration of the disclination dark line visually recognized by the observer becomes about half, and the disclination dark line is less recognized, as illustrated in FIG. 15D.

As illustrated in FIG. 15B, all of $87^{th}$ to $96^{th}$ gradations (high input gradation values) in the high gradation area in the first sub-frame image data are converted into the same saturated gradated values, as illustrated in FIG. 15B. Therefore, the disclination dark line does not occur in the high gradation area in the first sub-frame image. On the other hand, the disclination dark line may occur in the high gradation area in the second sub-frame image, but the disclination dark line does not occur in the high gradation area in the first sub-frame image. Thus, the disclination dark line does not continuously occur in the same lines (pixels) in the first and second continuous sub-frame images. The concentration of the disclination dark line becomes about half in any areas in the projected image, and the disclination line can be made less visually recognized.

Moreover, each of the first gain and the second gain is set to a gain that provides an average of 100% with each input gradation value or corresponds to the reference gain illustrated in FIG. 15A. This means that the luminance is lowered by the gain calculation with the second gain, by an increase amount of the luminance made through the gain calculation with the first gain. Hence, the luminance and gradation equivalent with those of the projected image displayed without the gain calculation can be expressed for all input gradation values of the input frame input data.

In displaying the first sub-frame image that contains the high gradation area converted into the saturated gradation value by the gain calculation, the liquid crystal pixel that displays the saturated gradation value has no disclination and the high gradation area to be converted into the saturated gradation value may be wider. However, when the high gradation area is converted into the saturated gradation value down to the low gradation area equal to or smaller than 50% of the maximum gradation value that can be input, the average gradation cannot be maintained between the first and second sub-frame images.

Figure 16A:
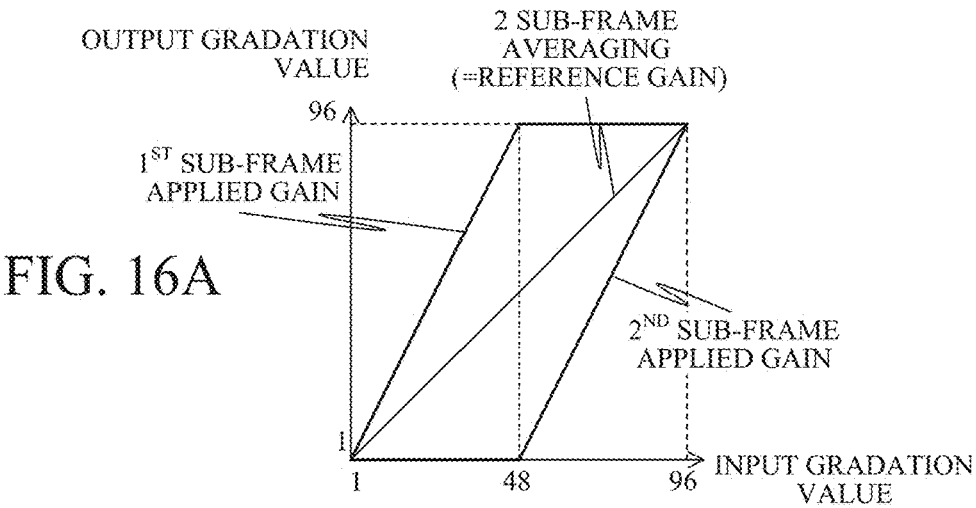
FIGS. 16A to 16C illustrate a comparative example of the first embodiment.
Figure 16B:
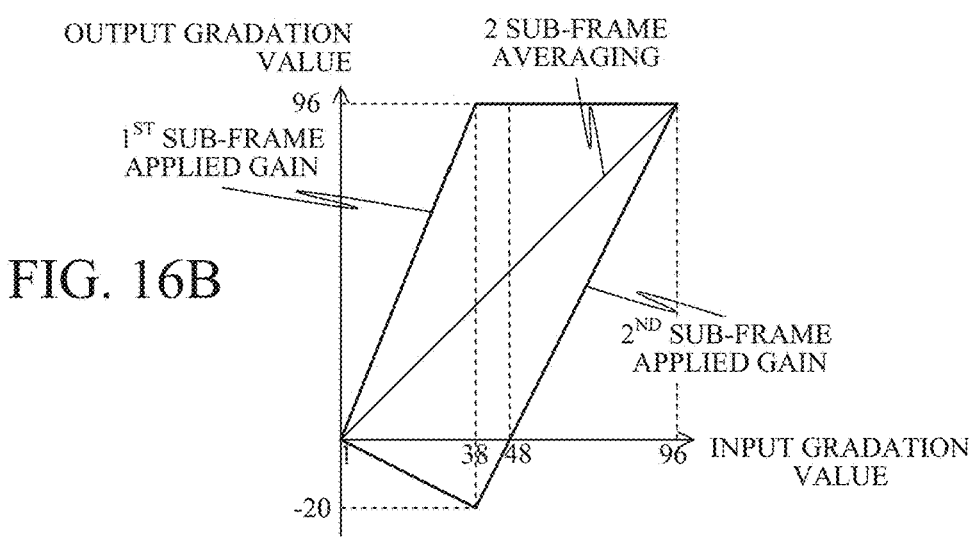
Figure 16C:
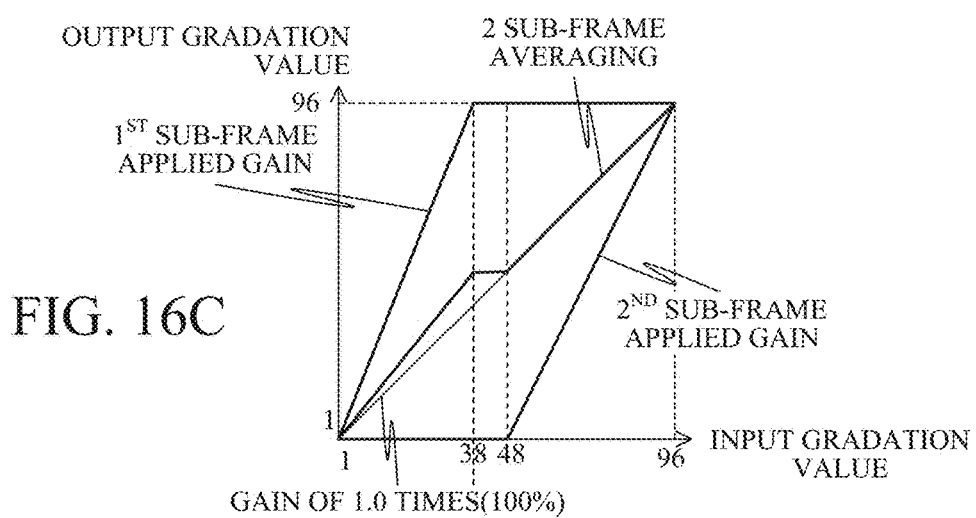

For example, FIG. 16A illustrates the first gain used to convert the input gradation value of 50% or higher of the maximum gradation value into the saturated gradation value. FIG. 16B illustrates the theoretical second gain for the first gain. In order to maintain the average gradation between the first and second sub-frame images, it is necessary to set the second gain so as to correct the input gradation value in the low gradation area into the negative output gradation value. However, since the negative output gradation value cannot be actually expressed, the first and second gains are set as illustrated in FIG. 16C and the average gradation lowers between the first and second sub-frame images. Thus, the first gain may be set so as to prevent the low gradation value lower than 50% of the maximum gradation value settable in the sub-frame image data from being converted into the saturated gradation value.

In order to equalize the average luminance of the two sub-frame images displayed through the gain calculation to the luminance of the projected image displayed without the gain calculation, the gain calculation may be provided after the input gradation value is converted so as to have a luminance linear relationship with the driving gradation of the liquid crystal pixel. When a difference is permissible between the average luminance of the two sub-frame images displayed through the gain calculation and the luminance of the projected image displayed without the gain calculation, the luminance linear converter 413 may be omitted and the gain calculation may be made without a conversion into the luminance linear relationship. Without the luminance linear converter 413, the process becomes simple, the circuit miniaturization is promoted, and the heat from the circuit can be reduced.

Figures 17A, 17B:
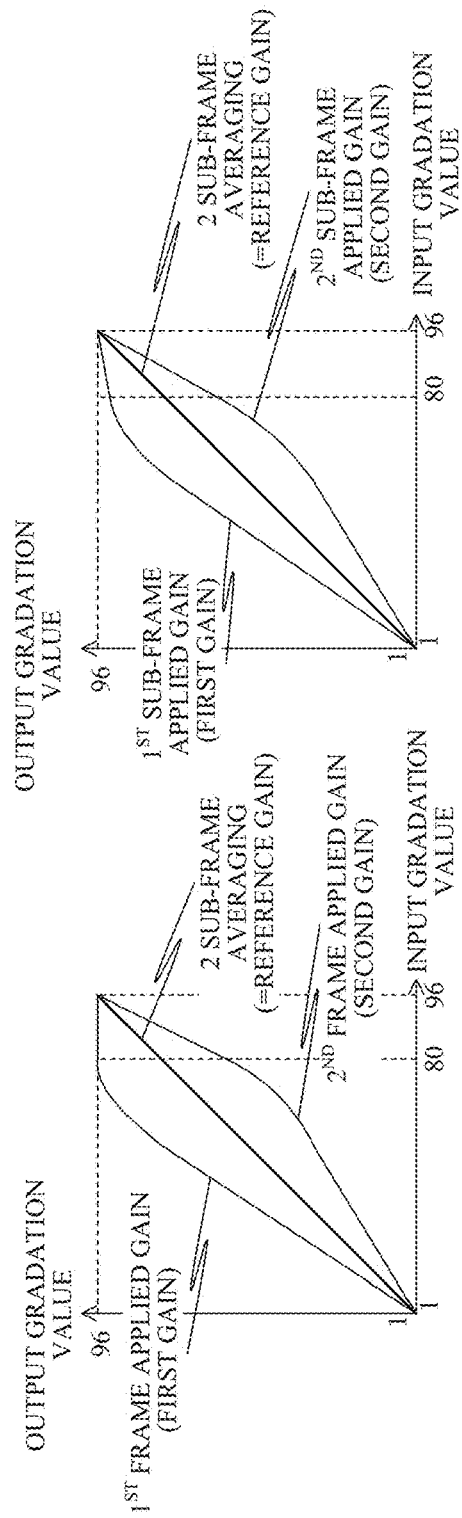
FIGS. 17A and 17B illustrate a variation of the first embodiment.

In order to make the disclination dark line less visually recognized, the first and second gains with the shapes illuminated in FIGS. 15B and 15C may not be used. For example, as illustrated in FIG. 17A, the inclinations of the first and second gains may be smoothly changed in particular, when it is difficult to obtain a smooth gradation through a calculation error by omitting the luminance linear converter 413, a smoother gradation can be obtained by setting the first gain having a smoothly changed inclination, as illustrated in FIG. 17A. In the same case, as illustrated in FIG. 17E, the gain applied to the high gradation area in the first gain may be set to a gain in which the high gradation area is not converted into the saturated gradation value. In other words, the first gain to the high gradation area may be set to the gain used to generate the first output gradation value with an increase ratio below 100% to the increase of the high input gradation value.

However, since the disclination dark line may occur in the high gradation area by converting the high gradation area into a saturated gradation value, the gain inclination to the high gradation area may be made as small as possible so as to restrain the disclination dark line.

This embodiment sets the gradation value equal to or smaller than the predetermined gradation value to a low gradation area and the gradation value larger than the predetermined gradation value to a high gradation area. In addition, each of the first and second gains is different between the low gradation value and the high gradation value. However, another gain may be set. For example, the image generator 410 may store a plurality of lookup table (LUT) as first and second data tables representing the first and second output gradation values for the input gradation value. In this case, the double-speed converter 411 can generate a plurality of sub-frame image data having different gains by changing the LUTs referred to for each generated sub-frame image data.

In addition, the LUT may include the output gradation value data for all input gradations, but needs a large storage capacity. Therefore, the LUT may include the output gradation value data for the representative input gradation value and convert the gradation value for the other input gradation value through the interpolation processing. Moreover, the first and second gains may be changed for each input frame image data.

This embodiment can restrain the luminance and the gradation of the projected image from lowering, and make less conspicuous the image degradation caused by the disclination by moving the disclination dark line for each sub-frame image.

Second Embodiment

Next follows a description of a second embodiment of the present invention. Those elements, which are corresponding elements in the first embodiment, will be designated by the same reference numerals.

The configuration of the driving circuit unit 303b in this embodiment is similar to that of the first embodiment, but operations of the first gain applier 414 and the second gain applier 415 are different from those of the first embodiment. More specifically, the first and second appliers 414 and 415 according to this embodiment performs a first gain calculation for the input gradation value equal to or smaller than a predetermined first gradation threshold and a second gain calculation for the input gradation value larger than the first gradation threshold and equal to or smaller than a predetermined second gradation threshold. Moreover, the first and second gain appliers 414 and 415 perform a third gain calculation for the input gradation value larger than a predetermined third gradation threshold. In other words, in this embodiment, the first and second gain appliers 414 and 415 can set two pairs of first and second gains applied to the input gradation value. A description will be given of the advantages obtained from this configuration.

The first embodiment discusses a view of the disclination dark line in displaying the gradation image in which a gradation value increases one by one for each pixel in the horizontal direction. In other words, a gradation difference is 1 between the adjacent liquid crystal pixels. When the gradation difference is small between the adjacent liquid crystal pixels, the position of the disclination dark line changes even when a difference (referred to as a "gain amplitude" hereinafter) is small between the first and second gains applied to the input gradation values for the first and second sub-frame image data. However, as the difference of the gradation value increases between the adjacent liquid crystal pixels, the position of the disclination dark line becomes less likely to change.

Figure 21A:
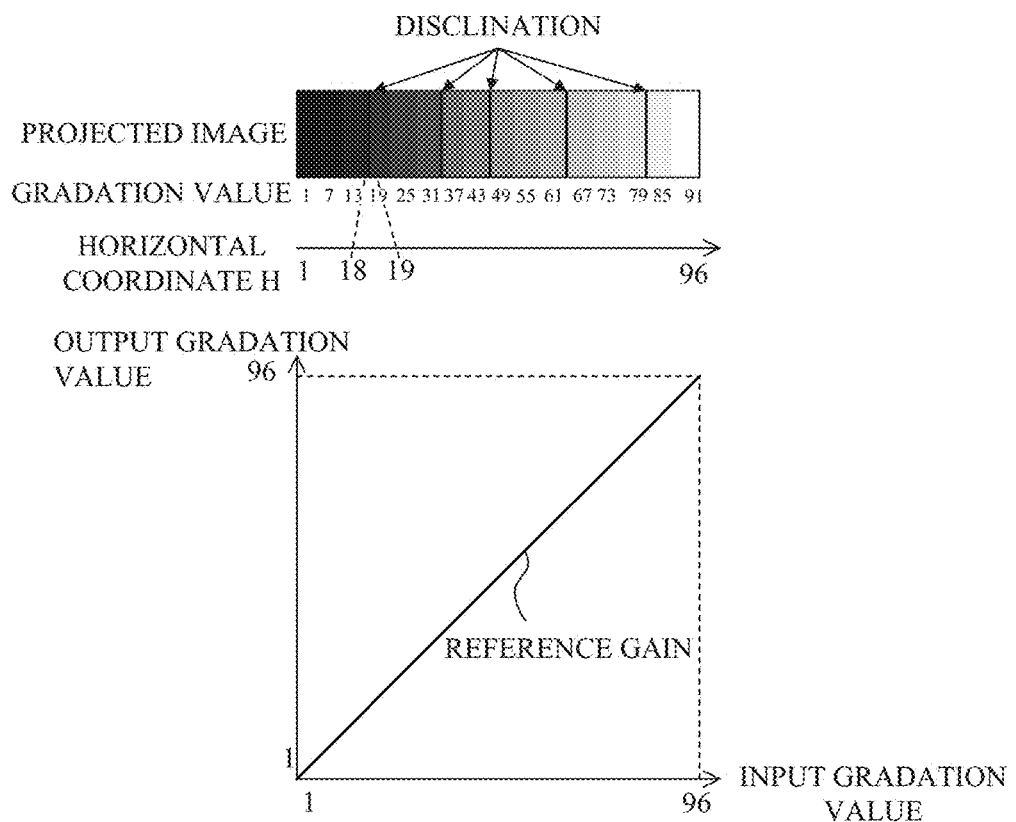
FIGS. 21A to 21C illustrate problems solved by the second embodiment.
Figures 21B, 21C:
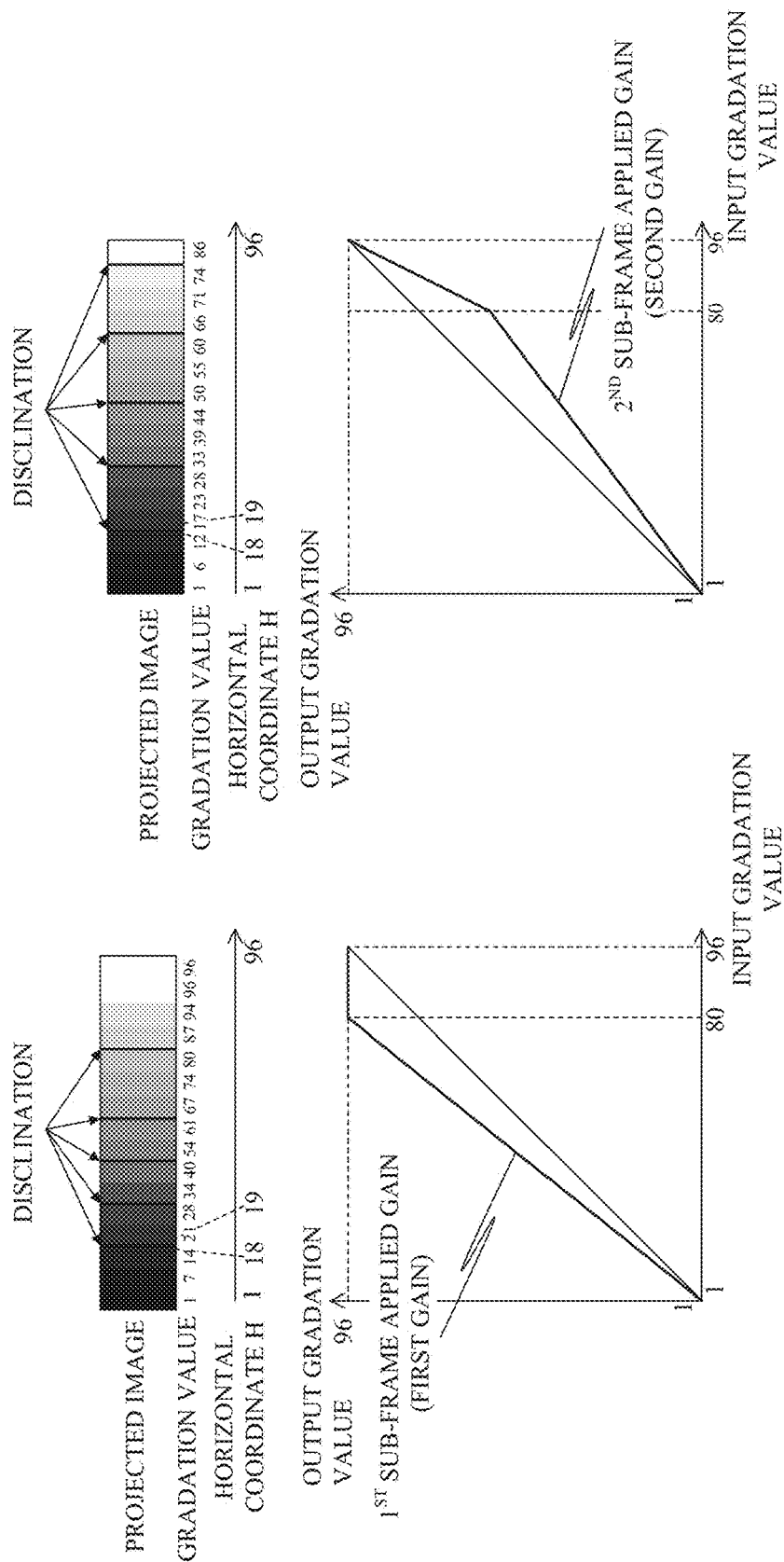

For example, FIGS. 21A to 21C illustrate an exemplary gradation image in which a gradation value increases every six for each pixel in the horizontal direction. FIG. 21A illustrates a relationship between the input gradation value and the output gradation value, similar to FIG. 15A in the first embodiment, where the gain calculation is not performed for or the reference gain of 1.0 times (100%) is applied to the input gradation value. At this time, the projected image has seven disclination dark lines.

FIGS. 21B and 21C illustrate the position (horizontal coordinate) of the disclination dark line in the horizontal direction where the first and second gains are set similar to FIGS. 15B and 15C as in the first embodiment. Since a gain amplitude is small for a gradation difference between the adjacent liquid crystal pixels having the disclination dark lines, the output gradation value by the gain calculation is less likely to change and the position of the disclination dark line is unlikely to change. As a result, as illustrated in FIG. 21D, the observer may visually recognize the disclination dark line.

Figures 22D, 22E:
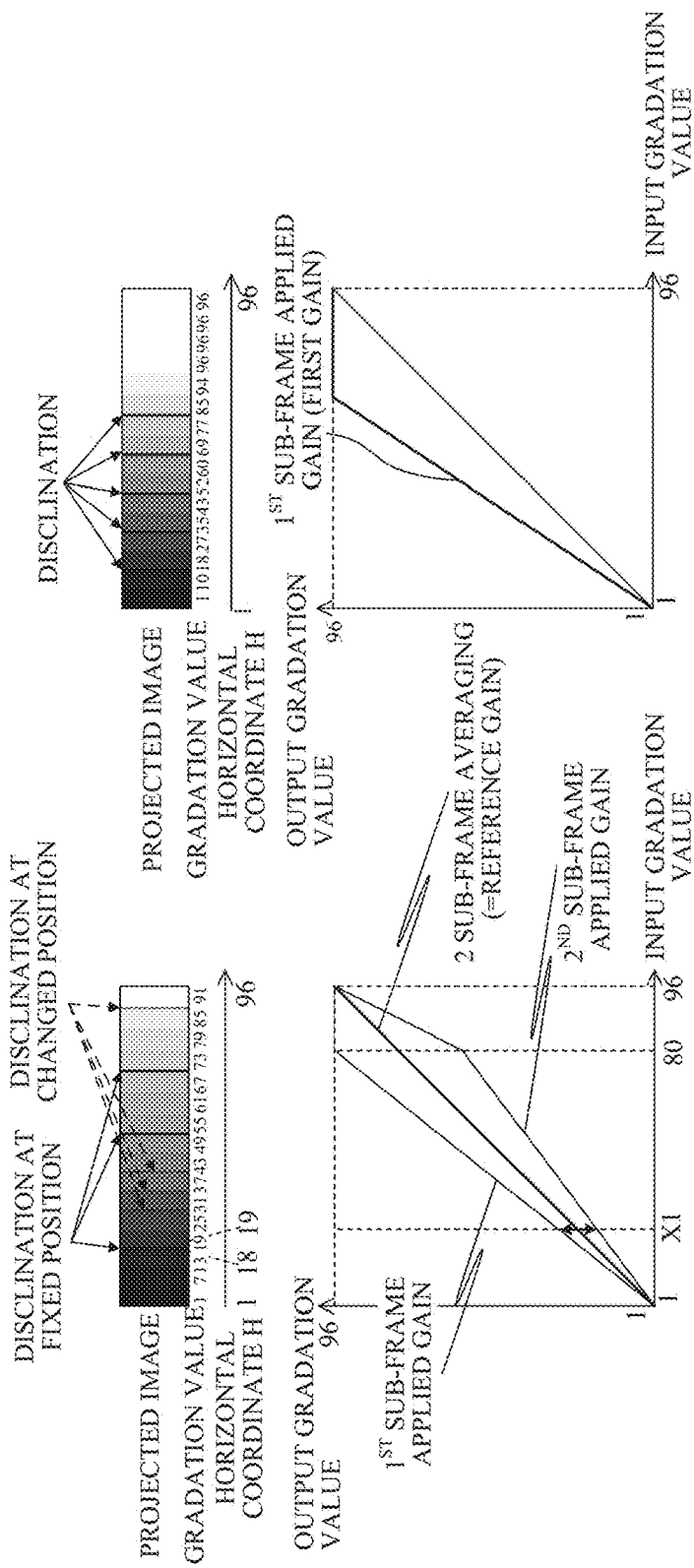

On the other hand, this embodiment uses a gain amplitude larger than that in the first embodiment. FIGS. 22D and 22E illustrate the first and second gains and a view of the disclination dark line in the projected image to which the first and second gains are applied, where A in the expression (1) in the first embodiment is set to 1.4. In this case, the gain amplitude is enough large for the gradation difference between the adjacent liquid crystal pixels having the disclination dark lines. Hence, the gradation value significantly changes due to the gain calculation, and the position of the disclination dark line changes for each sub-frame image. As a result, as illustrated in FIG. 22G, the disclination dark line can be made less visually recognized.

Since a variety of gradation values can be adjacent to each other the actual input frame image data, a large gain amplitude can increase the number of combinations of gradation values that make less visually recognized the disclination dark line.

Figure 19A:
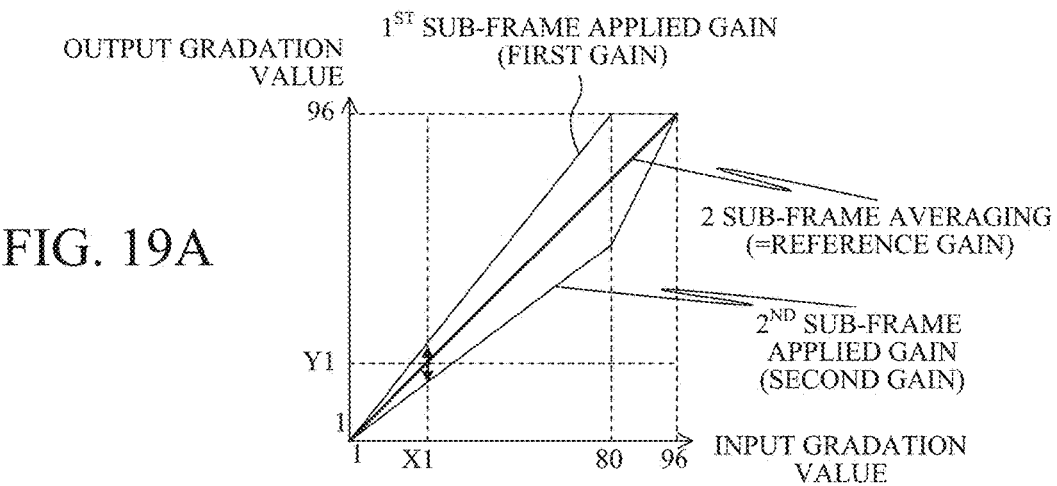
FIGS. 19A to 19C illustrate first and second gains according to a second embodiment and a comparative example.
Figure 19B:
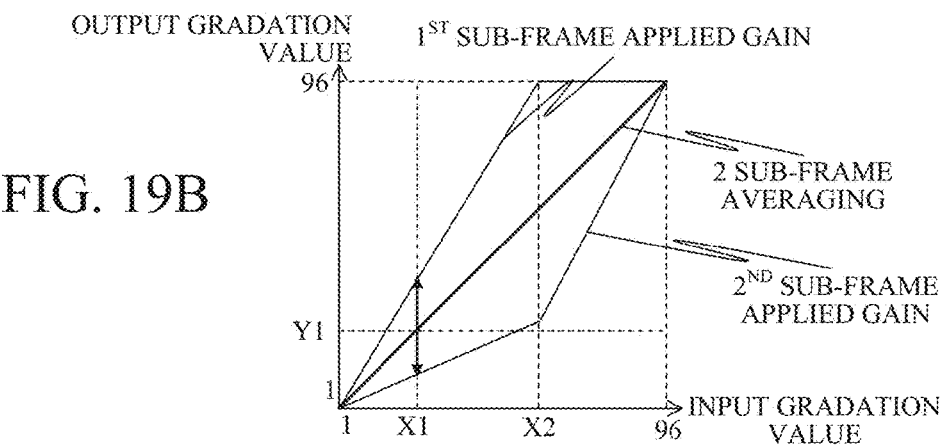

A description will be given of a situation in which a gain amplitude is made large in the first embodiment due to the above reasons. More specifically, the first embodiment sets a large gain amplitude as illustrated in FIG. 19A, and makes the disclination dark line near the input gradation value X1 less visually recognized. In this case, due to the above reasons, at is effective to apply a larger gain amplitude to the input gradation value X1, in order to make the disclination dark line less visually recognized. FIG. 19B illustrates an example in which a larger gain is applied to the input gradation value X1. The gain amplitude in the input gradation value X1 is much larger than that in FIG. 19A.

On the other hand, when the input gradation value X2 and its vicinity on the high gradation side of the input gradation value X1 are addressed, the gain amplitude is much larger than that in FIG. 19A. Thus, when the gain amplitude is excessively large, a brightness difference is large between the first and second sub-frame image data output from the output switch 419 and thus the observer may recognize the brightness difference as flickers.

Figure 19C:
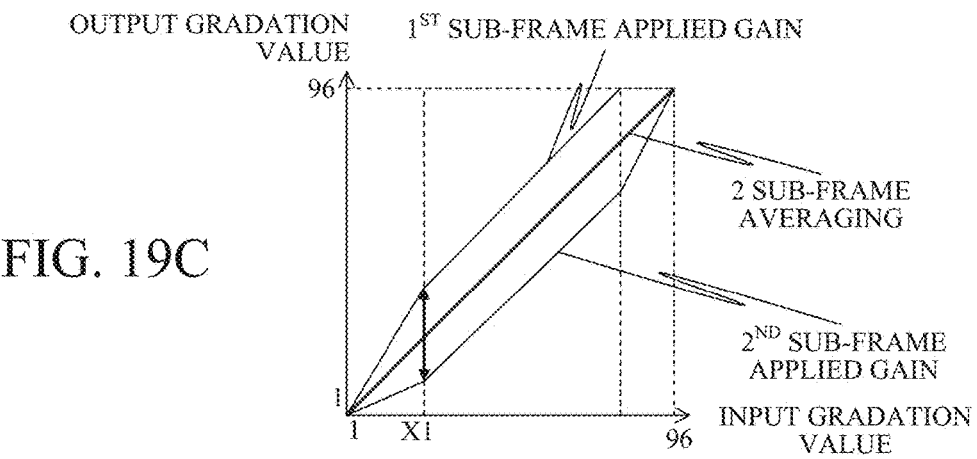

Accordingly, the first and second gain appliers 414 and 415 according to this embodiment set the first and second gains each having two variation points, as illustrated in FIG. 19C. A large gain amplitude is secured near the input gradation value X1 similar to FIG. 19B, and the disclination dark line can be less likely visually recognized. In addition, since the gain amplitude is set equivalent with that in FIG. 19A near the input gradation value X2 on the high gradation side, the brightness difference between the first and second sub-frame image data does not become large and the flickers can be restrained from being visually recognized.

As described above, this embodiment can restrain the flickers from being visually recognized and the disclination dark line on the low gradation side from being visually recognized by increasing two or more variation points of the first and second gains.

Third Embodiment

Next follows a description of a third embodiment according to the present invention. Those elements in this embodiment, which are corresponding elements in the first embodiment, will be designated by the same reference numerals.

Figure 18:
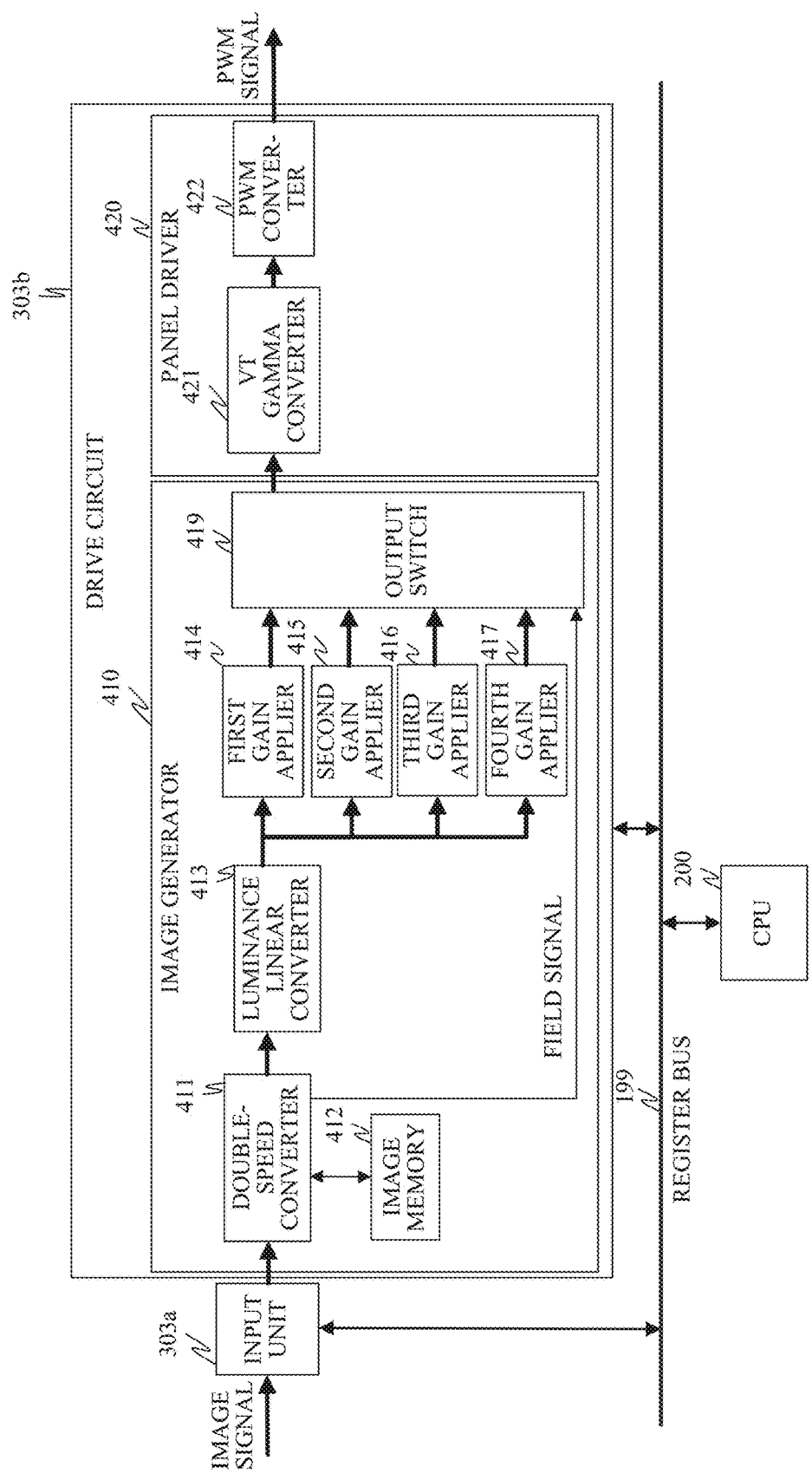
FIG. 18 is a block diagram of a configuration of a control circuit according to a third embodiment.

FIG. 18 illustrates an internal configuration of the driving circuit unit 303b according to this embodiment. This embodiment is different from the first embodiment that a third gain applier 416 and a fourth gain applier 417 are added between the luminance linear converter 413 and the output switch 419. The basic operation of each of the third gain applier 416 and the fourth gain applier 417 is similar to that of the first gain applier 414. A description will now be given of differences between this embodiment and the first embodiment.

The double-speed converter 411 in the first embodiment generates the first and second sub-frame image data by doubling the frequency of the vertical synchronizing signal for the input frame image data. In this case, for example, where the vertical synchronizing signal of the input frame image data has a frequency of 24 Hz, the vertical synchronizing signal of each sub-frame image data has a low frequency, such as 48 Hz, and the flickers may be visually recognized. Hence, the frequency of the vertical synchronizing signal of each sub-frame image data may be set high, such as about 90 Hz or higher, as long as the flickers are not visually recognized.

According to this embodiment, the double-speed converter 411 generates a plurality of sub-frame image data so that the vertical synchronizing signal of each sub-frame image data has a predetermined frequency or higher. The CPU 200 may determine the number of sub-frame image data generated by the double-speed converter 411 based on the frequency of the vertical synchronizing signal measured by the input unit 303a, or the double-speed converter 411 may measure and determine the frequency of the vertical synchronizing signal of the input frame image data.

More specifically, the double-speed converter 411 in this embodiment generates four sub-frame image data at a period corresponding to 96 Hz based on the input frame image data, where the vertical synchronizing signal of each input frame image data has a frequency of 24 Hz. The four sub-frame image data include in order of previous generations, first sub-frame image data, second sub-frame image data, third sub-frame image data, and fourth sub-frame image data. The double-speed converter 411 generates a field signal used to identify the generated sub-frame image data among the first, second, third, and fourth sub-frame image data, and outputs the field signal to the output switch 419.

The first and second gain appliers 414 and 415 perform gain processing that applies the first and second gains to the input gradation value in the first and second sub-frame image data, similar to the first embodiment. The first and second gain appliers 414 and 415 output the first and second gain-processed sub-frame image data to the output switch 419. The third gain applier 416 performs gain processing that applies the third gain to the input gradation value in the third sub-frame image data, and outputs the third sub-frame image data having the third gain-processed output gradation value to the output switch 419. The fourth gain applier 417 performs gain processing that applies the fourth gain to the input gradation value in the fourth sub-frame image data, and outputs the fourth sub-frame image data having the fourth gain-processed output gradation value to the output switch 419.

The output switch 419 sequentially switches and outputs the first to fourth sub-frame image data output from the first to fourth gain appliers 414 to 417 in synchronization with the vertical synchronizing signal of each sub-frame image data and in accordance with the field signal from the double-speed converter 411. Thereby, the first to fourth gain-calculated sub-frame image data are sequentially input to the panel driver 420.

FIGS. 20A to 20G illustrate the first to fourth gains applied by the first to fourth gain appliers 414 to 417 in this embodiment and the disclination dark line in the projected image visually recognized by the observer. Similar to FIG. 15A in the first embodiment, FIG. 20A illustrates a relationship between the input gradation value and an output gradation value where no gain operations are performed or where the reference gain of 1.0 times (100%) is applied to the input gradation value. At this time, the projected image has seven disclination dark lines.

FIGS. 20B and 20C illustrate the first and second gains applied by the first and second gain appliers 414 and 415. The first and second gains are similar to those illustrated in FIGS. 15B and 15C in the first embodiment.

When the first and second gains are applied to the third and fourth sub-frame image data, the first gain is applied to the first and third sub-frame image data and the second gain is applied to the second and fourth sub-frame image data. In this case, the disclination dark lines are generated at corresponding positions in at least two of the projected (displayed) four sub-frame images. Hence, the concentration of the disclination dark line visually recognized by the observer becomes about half of that without the gain calculation, and the disclination can be made less visually recognized.

However, this embodiment makes the disclination dark line less visually recognized, as described above, by using the gains different from the first and second gains for the third and fourth gains.

FIGS. 20D and 20E illustrate the third and fourth gains. The high and low gradation areas set by the third and fourth gains 416 and 417 are different from those set by the first and second gain appliers 414 and 415. More specifically, the third and fourth gain appliers 416 and 417 set the low gradation area to an area of the input gradation value of 1 to 67, and the high gradation area to an area of the input gradation value of 66 to 96. Thus, gains are set which have different inclinations between the high gradation area and the low gradation area.

The third and fourth gains are set to gains such that the average of the third and fourth gains is 1.0 times (100%). The third gain is different from the first gain and set to a gain that does not convert the input gradation value in the high gradation area in the third sub-frame image data into the saturated gradation value. A description will be given of the reasons as follows.

If the high gradation area in the third sub-frame image data is converted into the saturated gradation value, the inclination of the fourth gain applied to the high gradation area in the fourth sub-frame image must be set to 2.0 times (200%) so that the average between the fourth gain and the third gain is 100%. On the other hand, the inclination of the second gain applied to the high gradation area in the second sub-frame image data is also 2.0 times (200%). As a result, the disclination dark lines may be generated at corresponding positions in the displayed second and fourth sub-frame images. When the disclination dark lines occur in two out of the four sub-frame images, the concentration of the disclination dark line visually recognized by the observer does not become lower than about half. In order to enhance the effect of making the disclination dark line less visually recognized, the gains applied to the first to fourth sub-frame image data may have inclinations different from one another.

When the third gain is set, to a gain that does not convert the high gradation area in the third sub-frame image data into the saturated gradation value as illustrated in FIG. 20D, the first to fourth gains may have inclinations different from one another. As a result, the positions of the disclination dark lines a the displayed first to fourth sub-frame images are different from one another, and the concentration of the disclination dark line visually recognized by the observer becomes about quarter. This configuration can further enhance the effect of making the disclination dark line less visually recognized.

Thus, this embodiment can generate the four sub-frame image data based on the input frame image data. This configuration can restrain the brightness and the gradation of the projected image from dropping and the disclination dark line from being visually recognized.

Herein, the flicker may be visually recognized depending on the outputting order of the first to fourth gain-calculated sub-frame image data from the output switch 419.

Assume that the first and third sub-frame images displayed through the applications of the first and third gains higher than 100% are bright sub-frame images. In addition, assume that the second and fourth sub-frame images displayed through the applications of the first and third gains lower than 100% are dark sub-frame images. At this time, the flicker may be visually recognized when the sub-frame images are displayed in order of the bright sub-frame image, the bright sub-frame image, the dark sub-frame image, and the dark sub-frame image. Hence, the output switch 419 may output the sub-frame image data corresponding to the bright sub-frame image and the dark sub-frame image alternately. In other words, the sub-frame image data corresponding to the bright sub-frame image may not be continuously output or the sub-frame image data corresponding to the dark sub-frame image may not be continuously output.

In other words, the output switch 419 in this embodiment may output the first to fourth sub-frame image data in one of the following orders: "the first (bright), second (dark), third (bright), and fourth (dark) sub-frame images;" "the first (bright), fourth (dark), third (bright), and second (dark) sub-frame images;" "the second (dark), third (bright), fourth (dark), and first (bright) sub-frame images;" "the second (dark), first (bright), fourth (dark), and third (bright) sub-frame images;" "the third (bright), fourth (dark), first (bright), and second (dark) sub-frame images;" "the third (bright), second (dark), first (bright), fourth (dark) sub-frame images;" "the fourth (dark), first (bright), second (dark), and third (bright) sub-frame images;" and "the fourth (dark), third (bright), first (bright), and second (dark) sub-frame images."

The double-speed converter 411 in the first to third embodiments generate an even number of sub-frame image data for the input frame image data, but may generate an odd number of sub-frame image data. In this case, a similar effect can be obtained by applying a gain (reference gain) of 1.0 times (100%) to one of a generated odd number of sub-frame image data, and by applying a gain different from 1.0 times described in the first to third embodiments to other sub-frame image data.

More specifically, when the double-speed converter 411 generates five sub-frame image data for the input frame image data, a gain of 1.0 times (100%) is applied to one of five sub-frame image data. A gain different from 1.0 times is applied to the other four sub-frame image data similar to the third embodiment.

Since the output switch 419 switches the outputs of these sub-frame image data at a speed that cannot be visually recognized by the observer, the observer observes a projected image having an averaged luminance among the five displayed sub-frame images even when the outputting order is changed. Therefore, the gradation of the projected image can be maintained.

The timing of outputting the sub-frame image data is not limited, to which the above gain of 1.0 times (100%) is applied. However, the bright sub-frame images may not be continuously output.

Thus, even when the odd number of sub-frame image data are generated, similar to the generation of the even number of sub-frame image data, the disclination dark line is moved for each sub-frame image by restraining the brightness and the gradation of the projected image from lowering. Thereby, the image deterioration by the disclination can be made less visually recognized.

Fourth Embodiment

Next follows a fourth embodiment of the present invention. Those elements in this embodiment, which are corresponding elements in the first embodiment, will be designated by the same reference numerals, and a description thereof will be omitted. The parameter determining method applied to the first and second gain appliers 414 and 415 is similar to that in the first embodiment, but this embodiment is different from the embodiment in that this embodiment initially outputs the dark sub-frame and then outputs the bright sub-frame. The dark sub-frame, as used herein, is a sub-frame to which the gain below 100% is applied, and the bright frame is a sub-frame to which the gain above 100% is applied. As in this embodiment, the disclination dark line can be made less visually recognized initially outputting the dark sub-frame and by next outputting the bright sub-frame. The reason will be given as follows.

As explained in the first embodiment, the disclination needs several milliseconds for generations due to a transient response. On the other hand, a time (referred to as "relaxation time") from when the disclination occurs to when the disclination dark line not visually recognized also has a transient response. In order to relax the disclination, a predetermined time period is necessary in which the disclination does not occur or both adjacent liquid crystal pixels display white or black. Assume that this embodiment uses reflection type liquid crystal elements 3G, 3R, and 3B that provide the relaxation time longer than a generation time period from when the disclination is generated and to when it is visually recognized as dark lines. Thus, when the liquid crystal element with a long relaxation time is used, the disclination dark lines can be made visually recognized by previously displaying the first sub-frame as the dark sub-frame.

Figures 23A, 23B:
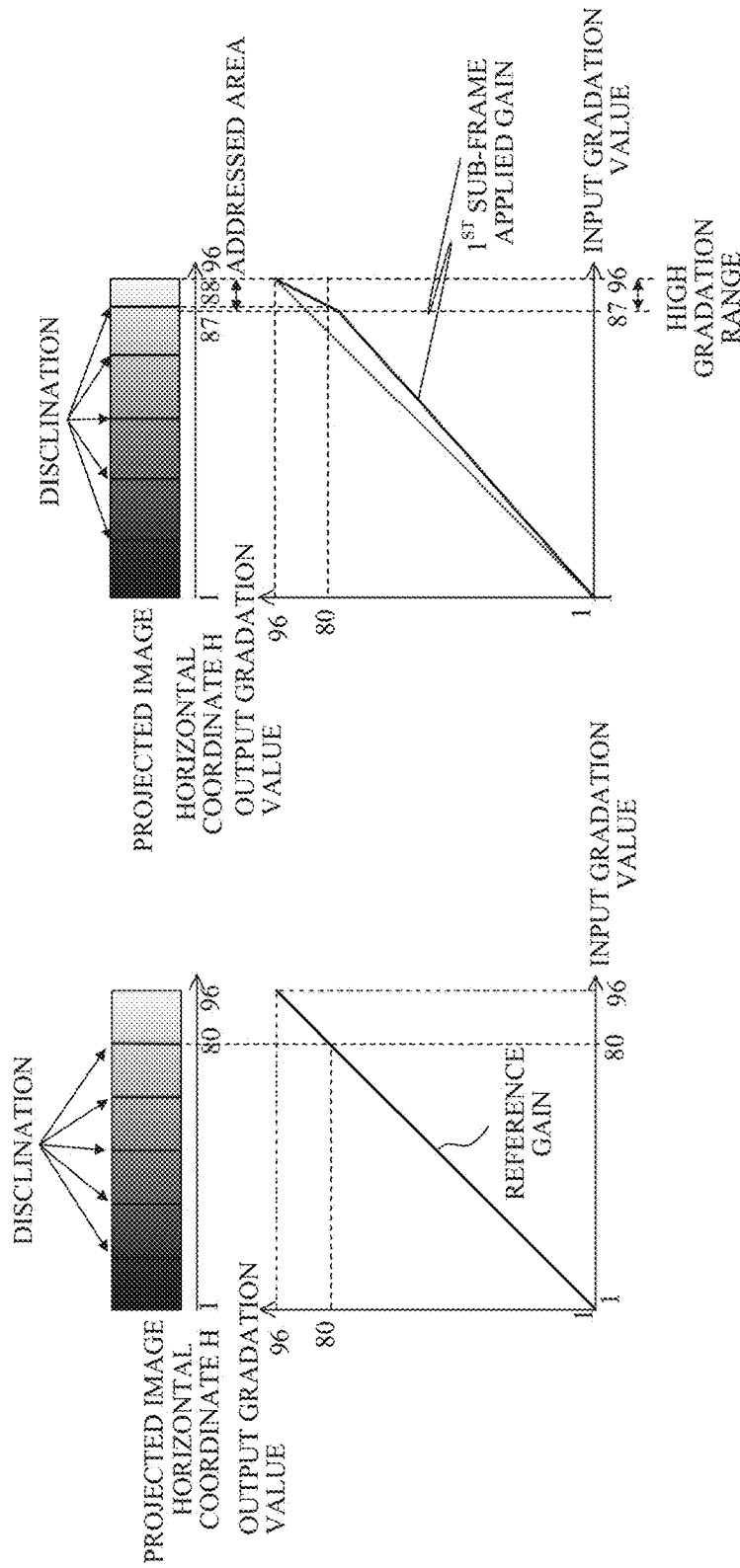
FIGS. 23A to 23D illustrate first and second gains and views of disclination dark lines according to the fourth embodiment.
Figures 23C, 23D:
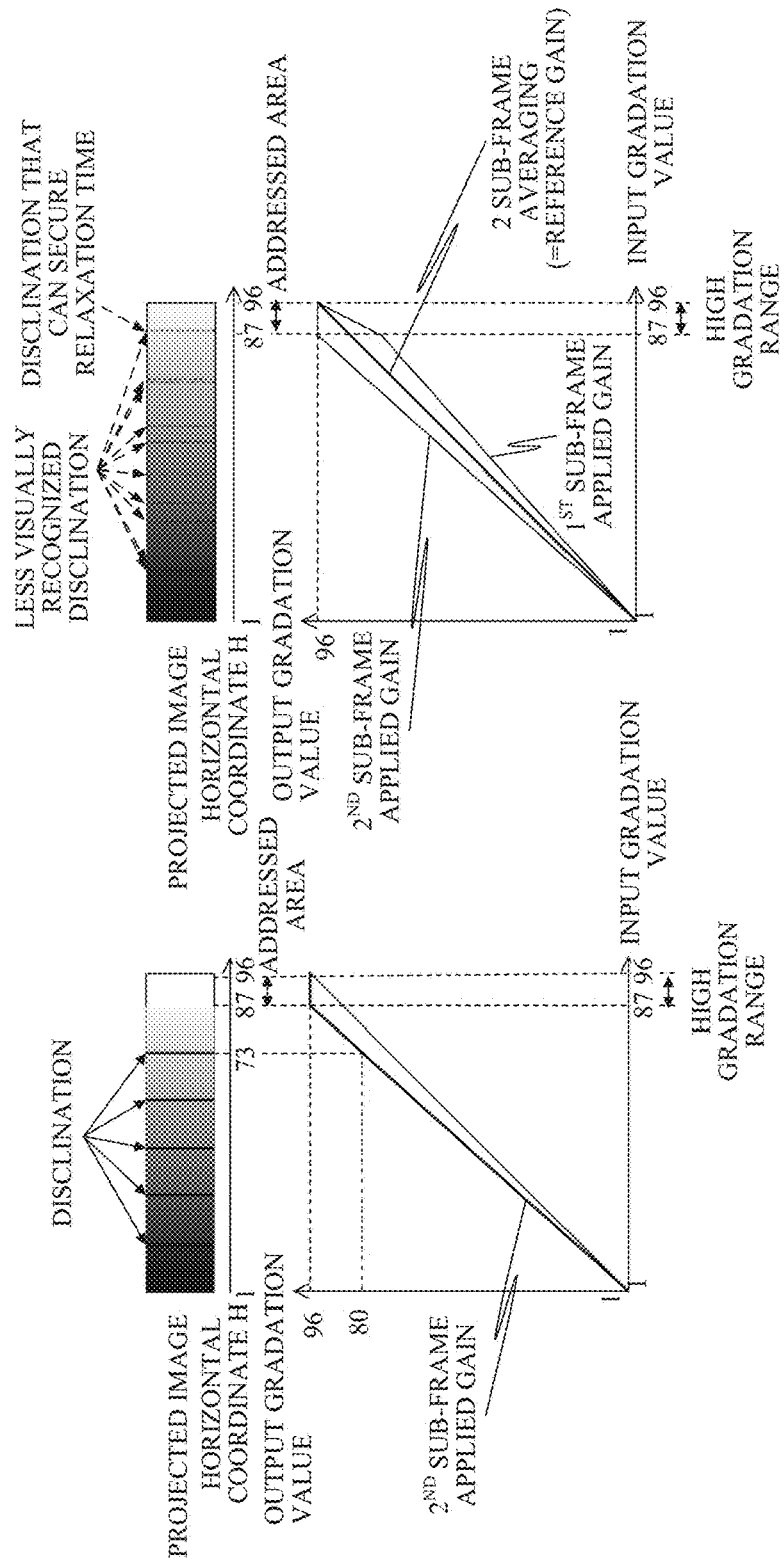

Referring now to FIGS. 23A to 23D, a description will be given of the reasons why the prior display of the dark sub-frame is preferable. Similar to the first embodiment, the PWM converter 422 in this embodiment drives the liquid crystal elements 3G, 3R, and 3B by the PWM in FIG. 5. FIG. 23A illustrates the projected image without the gain calculation. FIGS. 23B and 23C illustrate a relationship between the first and second gains which the first and second gain appliers 414 and 415 apply to the input gradation value in this embodiment and the view of the image quality deterioration caused by the disclination in the gradation image (projected image) projected on the target plane. FIG. 23D illustrates the disclination dark lines visually recognized by the observer.

A description will be given of the projected image area at horizontal coordinates H from 87 to 96 in FIGS. 23B and 23C. For description purposes, this area be referred to as an addressed area. The addressed area is an area used to output a saturated gradation value through a calculation by the second sub-frame applied gain in this embodiment for an input of the gradation image in FIG. 23A. In the addressed area in the first sub-frame, the disclination occurs between the adjacent liquid crystal pixels located at the horizontal coordinates H 88 and 89, as illustrated in FIG. 23B. On the other hand, the addressed area in the second sub-frame outputs the saturated gradation value and thus the disclination does not occur.

If the first sub-frame is the bright sub-frame and the second sub-frame is the dark sub-frame, the sufficient disclination relaxation period may not be secured depending on the gradation value in the next input frame image. On the other hand, as in this embodiment, when the first sub-frame is the dark sub-frame and the second sub-frame is the bright sub-frame, even though the first sub-frame has the disclination in the area in which the gradation in the at least high gradation area is input or the addressed area in this embodiment, a white display period between the adjacent liquid crystal pixels continues for one sub-frame period in the second sub-frame. Hence, a disclination relaxation time can be surely secured, and the disclination dark line can be made less visually recognized.

Referring now to FIGS. 24A to 24C, a more detailed description will be given of the reasons why the disclination relaxation time can be surely secured. In FIGS. 24A to 24C, a square represents a pixel and a figure in the square represents the gradation value in each pixel. Assume that a first sub-frame is a bright sub-frame and a second sub-frame is a dark sub-frame where input images A and B having a size of 1×10 rows are continuously input from the input unit 303a as illustrated in FIG. 24A. Then, FIG. 23B illustrates an image output from the output switch 419. In addition, FIG. 23C illustrates an image output from the output switch 419 where the first sub-frame is a dark sub-frame and the second sub-frame is a bright sub-frame For hatched pixels in FIGS. 23B and 23C, a white display period and a black display period are different from each other between the adjacent liquid crystal pixels in the PWM in one sub-frame period. In addition, for non-hatched pixels in FIGS. 23B and 23C, a white display period and a black display period are not different between the adjacent liquid crystal pixels in the PWM in one sub-frame period. In other words, the disclination can be relaxed in the non-hatched pixels in FIGS. 23B and 23C.

FIG. 23B illustrates an output image where the first sub-frame is a bright sub-frame and the second sub-frame is a dark sub-frame. In this case, the second sub-frame image for the input image A is a dark sub-frame, and the disclination occurs between the adjacent liquid crystal pixels outputting the gradation values 80 and 82 at the horizontal coordinates 2 and 3. In the subsequent sub-frames, the pixels at the horizontal coordinates 2 and 3 are hatched, and the white display period and the black display period are different between the adjacent pixels in the PWM in the one sub-frame period. This means that the generated disclination is hard to relax.

Where the first sub-frame is the dark sub-frame and the second sub-frame is the bright sub-frame, as illustrated in FIG. 23C, the first sub-frame image for the input image A is the dark sub-frame and the disclination occurs between the adjacent liquid crystal pixels that output the gradation values 80 and 82 at the horizontal coordinates 2 and 3. In the second sub-frame image for the input image A or the next sub-frame, all pixels are not hatched which contain pixels located at the horizontal coordinates 2 and 3, and the white display period and the black display period are not different from each other between the adjacent liquid crystal pixels in the PWM in the one sub-frame period. Hence, in comparison with FIG. 23B, a time period for relaxing the generated disclination is sufficiently secured, and the disclination dark lines can be made less visually recognized even when a liquid crystal element having a long disclination relaxation time is used.

Therefore, this embodiment can make less visually recognized image quality degradation caused by the disclination by moving the disclination dark line for each sub frame image while restraining the brightness and the gradation of the projected image from lowering. Moreover, this embodiment characteristically surely secure the disclination relaxation time by outputting the dark sub-frame and the bright sub-frame in this order, and make less visually recognized the image quality degradation caused by the disclination.

The gain curve shapes in FIGS. 23A to 23D are merely illustrative, and may have other shapes in the other embodiments, as illustrated in FIGS. 16A-C, 17A-B, and 19A-C, or unillustrated shapes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid crystal driving apparatus configured to drive a liquid crystal element having pixels, the liquid crystal driving apparatus comprising:
a generator configured to generate sub-frames including a first sub-frame having first gradation value and a second sub-frame having second gradation value based on an input frame; and
a driver configured to form a gradation in each of pixels of the liquid crystal element based on each gradation value in each of sub-frames by sequentially controlling an application of a first voltage and an application of a second voltage lower than the first voltage for the pixels in each of sub-field periods contained in one frame period,
wherein the generator obtains the first gradation value by applying first gain to an input gradation value of the input frame and obtains the second gradation value by applying second gain to the input gradation value, and
wherein the first gradation value is higher than the second gradation value and an average of the first gradation value and the second gradation value is equal to the input gradation value.

2. The liquid crystal driving apparatus according to claim 1, wherein
the first gain is above 100%, and
the second gain is below 100%.

3. The liquid crystal driving apparatus according to claim 1, wherein an average of the first gag and the second gain is 100%.

4. The liquid crystal driving apparatus according to claim 1, wherein an increasing ratio of the first gradation value to the input gradation value which is higher than a threshold value is smaller than an increasing ratio of the first gradation value to the input gradation value which is not higher than the threshold value.

5. The liquid crystal driving apparatus according to claim 4, wherein the first gradation value corresponding to the input gradation value which is higher than the threshold value is a maximum gradation value settable in the first sub-frame.

6. The liquid crystal driving apparatus according to claim 4, wherein the threshold value is higher than or equal to a gradation value with 50% of a maximum gradation value settable in the first sub-frame.

7. The liquid crystal driving apparatus according to claim 1, wherein the generator includes a first data table that contains data of the first gradation value to the input gradation value and a second data table that contains data of the second gradation value to the input gradation value, and
wherein in generating each of the first and second sub-frame, the generator refers to a corresponding one of the first data table and the second data table.

8. The liquid crystal driving apparatus according to claim 1, wherein the generator generates the first sub-frame after generating the second sub-frame for the input frame.

9. The liquid crystal driving apparatus according to claim 1, further comprising:
a light source configured to input light into the liquid crystal element; and
a projection lens configured to project light modulated by the liquid crystal element onto a target surface.

10. The liquid crystal driving apparatus according to claim 1, wherein the generator generates the second sub-frame such that the second gradation value of the second sub-frame increases as the input gradation value of the input frame increases.

11. An image display apparatus comprising:
a liquid crystal element; and
a liquid crystal driving apparatus configured to drive the liquid crystal element having a pixels,
wherein the liquid crystal driving apparatus includes:

a generator configured to generate sub-frames including a first sub-frame having first gradation value and a second sub-frame having second gradation value based on an input frame; and a driver configured to form a gradation in each of pixels of the liquid crystal element based on each gradation value in each of sub-frames by sequentially controlling an application of a first voltage and an application of a second voltage lower than the first voltage for the pixels in each of sub-field periods contained in one frame period, wherein the generator obtains the first gradation value by applying first gain to an input gradation value of the input frame and obtains the second gradation value by applying second gain to the input gradation value, and wherein the first gradation value is higher than the second gradation value and an average of the first gradation value and the second gradation value is equal to the input gradation value.

12. A liquid crystal driving method configured to drive a liquid crystal element having pixels, the liquid crystal driving apparatus method comprising the steps of:

generating sub-frames including a first sub-frame having first gradation value and a second sub-frame having second gradation value based on an input frame; and forming a gradation in each of pixels of the liquid crystal element based on each gradation value in each of sub-frames by sequentially controlling an application of a first voltage and an application of a second voltage lower than the first voltage for the pixels in each of sub-field periods contained in one frame period, wherein the first gradation value is obtained by applying first gain to an input gradation value of the input frame and the second gradation value is obtained by applying second gain to the input gradation value, and wherein the first gradation value is higher than the second gradation value and an average of the first gradation value and the second gradation value is equal to the input gradation value.

13. A non-transitory computer-readable storage medium for storing a program that enables a computer to execute a liquid crystal driving method configured to drive a liquid crystal element having pixels, the liquid crystal driving apparatus method comprising the steps of:

generating sub-frames including a first sub-frame having first gradation value and a second sub-frame having second gradation value based on an input frame; and forming a gradation in each of pixels of the liquid crystal element based on each gradation value in each of sub-frames by sequentially controlling an application of a first voltage and an application of a second voltage lower than the first voltage for the pixels in each of sub-field periods contained in one frame period, wherein the first gradation value is obtained by applying first gain to an input gradation value of the input frame and the second gradation value is obtained by applying second gain to the input gradation value, and wherein the first gradation value is higher than the second gradation value and an average of the first gradation value and the second gradation value is equal to the input gradation value.

* * * * *